United States Patent
Tavares et al.

(10) Patent No.: US 10,484,210 B2
(45) Date of Patent: Nov. 19, 2019

(54) SUCCESSIVE INTERFERENCE CANCELLATION AND MULTI-USER MINIMUM MEAN SQUARE CHANNEL ESTIMATION BASED ON SOFT DECODING INFORMATION

(71) Applicants: Marcos Tavares, Marlboro, NJ (US); Dale Douglas Harman, Freehold, NJ (US); Milan Zivkovic, Stuttgart (DE); Juergen Otterbach, Stuttgart (DE); Dragan Samardzija, Highlands, NJ (US)

(72) Inventors: Marcos Tavares, Marlboro, NJ (US); Dale Douglas Harman, Freehold, NJ (US); Milan Zivkovic, Stuttgart (DE); Juergen Otterbach, Stuttgart (DE); Dragan Samardzija, Highlands, NJ (US)

(73) Assignees: Alcatel Lucent, Murray Hill, NJ (US); Nokia of America Corporation, Murray Hill, NJ (US)

(\*) Notice: Subject to any disclaimer, the term of this patent is extended or adjusted under 35 U.S.C. 154(b) by 0 days.

(21) Appl. No.: 15/472,865

(22) Filed: Mar. 29, 2017

(65) Prior Publication Data
US 2018/0287828 A1 Oct. 4, 2018

(51) Int. Cl.
*H04L 25/03* (2006.01)
*H04J 11/00* (2006.01)
(Continued)

(52) U.S. Cl.
CPC ...... *H04L 25/03006* (2013.01); *H04J 11/004* (2013.01); *H04L 1/005* (2013.01);
(Continued)

(58) Field of Classification Search
CPC ...... H04B 7/0452; H04B 7/0413; H04B 1/10; H04B 15/00; H04L 25/03006;
(Continued)

(56) References Cited

U.S. PATENT DOCUMENTS 9,260,335 B1 2/2016 Miller et al.
9,503,203 B2 11/2016 Wood
(Continued)

OTHER PUBLICATIONS

3GPP TR 36.829 V11.1.0, "3rd Generation Partnership Project; Technical Specification Group Radio Access Network; Enhanced performance requirement for LTE User Equipment (UE) (Release 11)," Dec. 2012, 114 pages.
(Continued)

*Primary Examiner* — Betsy Deppe

(57) ABSTRACT

An apparatus, such as a base station or a user equipment, includes a transceiver configured to receive a first signal that is a superposition of symbols transmitted concurrently by users in shared resources of an air interface. The apparatus also includes a processor configured to iteratively cancel, for the users, interference produced by the symbols transmitted by other users on the basis of log likelihood ratios (LLRs) that represent likelihoods that previous estimates of the symbols transmitted by the other users are correct. The processor is also configured to iteratively decode the symbols transmitted by the users after canceling the interference produced by the symbols transmitted by the other users.

21 Claims, 17 Drawing Sheets

(51) Int. Cl.
*H04L 1/00* (2006.01)
*H04L 25/02* (2006.01)
*H04B 7/0452* (2017.01)
*H04B 7/06* (2006.01)

(52) U.S. Cl.
CPC ........ *H04L 1/0048* (2013.01); *H04L 25/0204* (2013.01); *H04L 25/0224* (2013.01); *H04L 25/0328* (2013.01); *H04B 7/0452* (2013.01); *H04B 7/0617* (2013.01); *H04L 1/0054* (2013.01)

(58) Field of Classification Search
CPC ............ H04L 25/0328; H04L 25/0204; H04L 25/0224; H04L 1/005; H04L 1/0048; H04J 11/004
See application file for complete search history.

(56) References Cited

U.S. PATENT DOCUMENTS

| | | | | |
|---|---|---|---|---|
| 9,521,018 | B1* | 12/2016 | Bose | H04L 25/0204 |
| 2003/0214917 | A1* | 11/2003 | Molisch | H04L 1/06 370/286 |
| 2008/0152052 | A1* | 6/2008 | Thomas | H04L 27/2647 375/346 |
| 2008/0192809 | A1 | 8/2008 | Kim et al. | |
| 2010/0034110 | A1 | 2/2010 | Kim et al. | |
| 2010/0166118 | A1* | 7/2010 | Mantravadi | H04L 25/022 375/340 |
| 2011/0211536 | A1* | 9/2011 | Khattak | H04L 25/03006 370/328 |
| 2015/0049792 | A1* | 2/2015 | Han | H04L 25/03012 375/219 |
| 2015/0358064 | A1* | 12/2015 | Benjebbour | H04B 7/0452 370/329 |
| 2016/0218781 | A1* | 7/2016 | Seifert | H04B 7/0417 |
| 2018/0027541 | A1* | 1/2018 | Wu | H04L 5/0048 370/329 |

OTHER PUBLICATIONS

3GPP TSG-RAN WG4 Meeting #82 PowerPoint Presentation, "WF on intra-cell interference modeling and simulation cases for BS IC," Feb. 13-17, 2017, 7 pages.

Axnas, et al., "Successive Interference Cancellation Techniques for LTE Downlink," IEEE 22nd International Symposium on Personal, Indoor and Mobile Radio Communications, Sep. 11-14, 2011, 5 pages.

Kwon, et al., "Successive Interference Cancellation via Rank-Reduced Maximum A Posteriori Detection," IEEE Transactions on Communications, vol. 61, Issue 2, Feb. 2013, 10 pages.

Li, et al., "Multiple Feedback Successive Interference Cancellation Detection for Multiuser MIMO Systems," IEEE Transactions on Wireless Communications, vol. 10, Issue 8, Aug. 2011, 6 pages.

Mondin, et al., "Simulation and Complexity Analysis of Iterative Interference Cancellation Receivers for LTE/LTE-Advanced," World Telecommunications Congress, Jun. 1-3, 2014, 6 pages.

Ruegg, et al., "Iterative SIC receiver scheme for non-orthogonally superimposed signals on top of OFDMA," Bell Labs Technical Journal, vol. 13, Dec. 2009, 6 pages.

Wang, et al., "Iterative (Turbo) Soft Interference Cancellation and Decoding for Coded CDMA," IEEE Transactions on communications, vol. 47, Jul. 1999, 16 pages.

Zeng, et al. "RIePDMA and BP-IDD-IC detection," EURASIP Journal on Wireless Communications and Networking, Dec. 2017, 9 pages.

Zhang, et al., "LTE-Advanced Air Interface Technology," CRC Press, 2012, 4 pages.

International Search Report and Written Opinion dated Jul. 2, 2018 for PCT/US18/024732, 18 pages.

Choi et al., "Spectral Efficient Multiuser Technique with Channel-Dependent Resource Allocation Schemes", IEEE Transactions on Wireless Communications, vol. 11, Issue 3, Mar. 2012, 10 pages.

Zivkovic et al., "An SDR-based Turbo-SIC Implementation: Towards a 5G New Radio Advanced Receiver for Uplink Boosting", IEEE International Symposium on Personal, Indoor, and Mobile Radio Communications (PIMRC), Oct. 2017, 7 pages.

* cited by examiner

SUCCESSIVE INTERFERENCE CANCELLATION AND MULTI-USER MINIMUM MEAN SQUARE CHANNEL ESTIMATION BASED ON SOFT DECODING INFORMATION

BACKGROUND

Upcoming generations of wireless communication systems, such as Fifth Generation (5G) communication systems, are expected to enable applications such as virtual reality, augmented reality, reliable remote operation of machines, factory automation, network-assisted control of traffic and self-driving vehicles, and the cellular "Internet of Things (IoT)" that supports internetworking of physical devices such appliances, vehicles, buildings, and other items that are embedded with electronics, software, sensors, actuators, and network connectivity that enable the devices to collect and exchange data over the Internet. Future 5G communication systems will therefore be required to support gigabit per second data rates (e.g., to support virtual or augmented reality applications), end-to-end latencies of at most 10 milliseconds (ms) (e.g., to support factory automation applications), reliabilities of at least 99.999% (e.g., for automotive traffic control applications such as platooning), and user equipment densities of tens of millions of devices per square kilometer (e.g., to support cellular IoT applications).

The radio interface defined by current 4G standards is not able to meet the requirements set out for future 5G communication systems. For example, the system bandwidth and multiple antenna configuration options specified in the 4G standards are not able to provide gigabit per second data rates for large numbers of users. For another example, the frame structure defined by the 4G standards, as well as the random access, control signaling, retransmission, and scheduling mechanisms in the 4G standards are not designed to support end-to-end latencies of 10 ms or less. For yet another example, modulation and coding schemes, antenna configuration options, network connectivity options, and receiver algorithms set forth in the 4G standards are not designed to provide 99.999% reliability. For yet another example, the techniques for pairing or scheduling of user equipment, pilot symbols such as demodulation reference signals, power control mechanisms, random access mechanisms, control signaling, antenna configuration options, and receiver algorithms specified by the 4G standards are not able to support concurrent communication with devices at the densities required by IoT applications.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
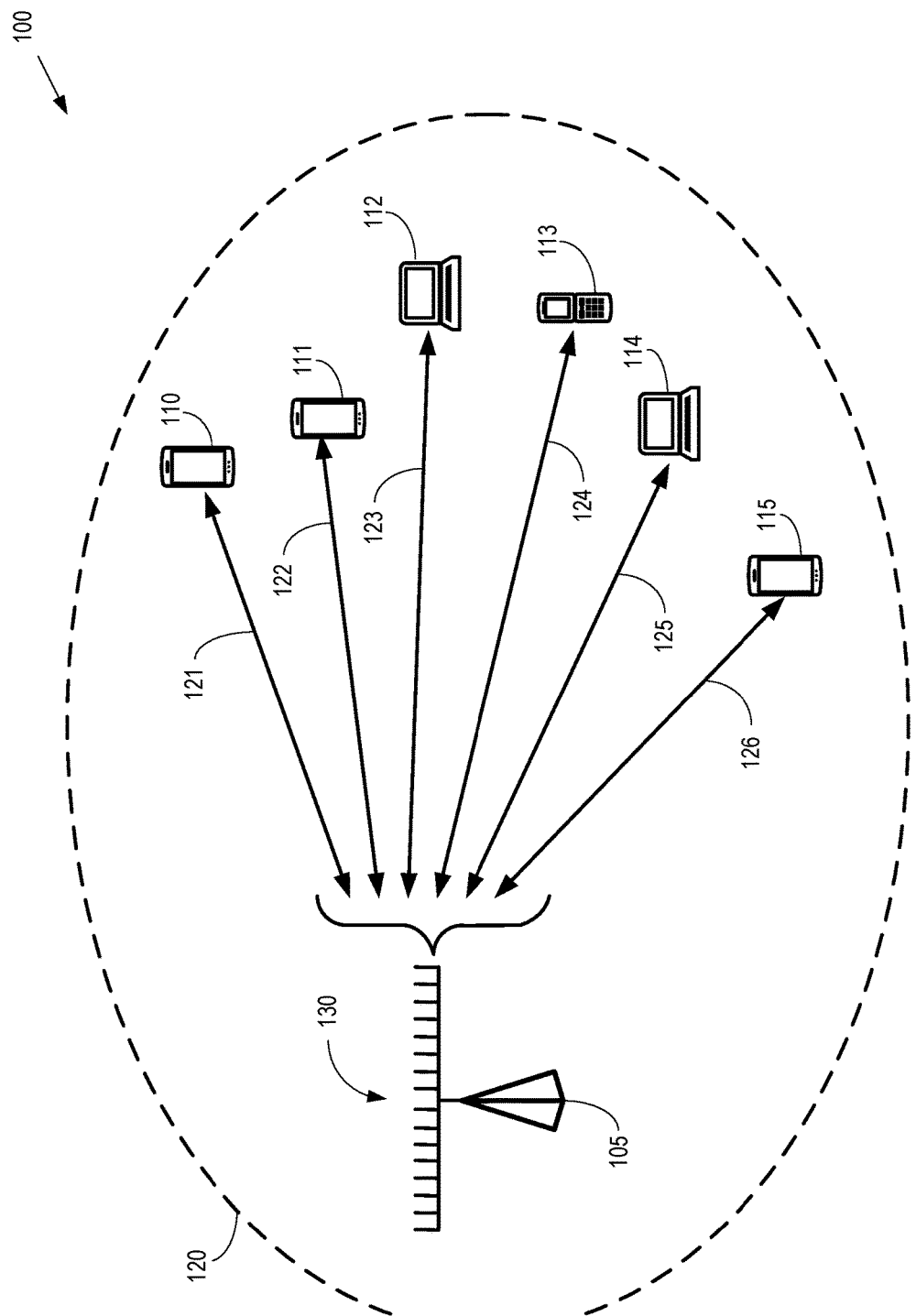
FIG. 1 illustrates a first example of a wireless communication system according to some embodiments.

The receiver algorithms used to detect and decode signals received by base stations and user equipment that operate according to the 4G standards represent a roadblock on the way to 5G. Receivers that operate according to the 4G standards use linear minimum mean square error (MMSE) algorithms to estimate values of symbols transmitted to the receiver based on the signals received by the receiver. Although linear MMSE algorithms are effective in typical 4G scenarios, such as mobile broadband communication applications including voice or text applications for inter-user communication or broadband streaming, linear MMSE algorithms are not expected to meet the requirements of 5G wireless communication systems. For example, applying linear MMSE to decode signals received concurrently from user equipment with spatially correlated channels, such as the signals received from the high densities of IoT devices, is known to leave behind high levels of residual interference that are detrimental to the throughput achieved for each user equipment. For another example, linear MMSE receivers are not always able to detect signals from individual user equipment when the number of user equipment that are concurrently transmitting exceeds the number of available receive antennas. Consequently, the number of users that can be served per square kilometer per hertz is limited by the number of receive antennas. For yet another example, coordinated multipoint (CoMP) reception of signals from a transmitter by more than one receiver that implements linear MMSE requires high-capacity backhaul connections to interconnect the receivers. For yet another example, linear MMSE receivers do not offer many alternatives to adapt to different quality of service (QoS) requirements on a particular radio carrier.

The data rates, latency, reliability, and concurrent user requirements of a receiver in a 5G wireless communication system can be satisfied by applying successive interference cancellation (SIC) to a received signal that is formed from concurrent signals transmitted by a plurality of transmitters on the basis of soft decoding information such as log likelihood ratios (LLRs) that represent likelihoods that previous estimates of symbols transmitted by the plurality of transmitters in the received signal are correct. In some embodiments, the receiver iteratively selects one or more of the plurality of transmitters and cancels interference at the receiver based on the LLRs for other transmitters that have been selected for decoding in a previous iteration. The receiver reconstructs symbols for the other transmitters based on the LLRs for the other transmitters and estimates channels for the plurality of transmitters by applying multi-user MMSE to pilot symbols received from the plurality of transmitters. Interference from the other transmitters is estimated by combining the estimated channels with the reconstructed symbols and the estimated interference is subtracted from the received signal. Single-user MMSE is applied to the received signal after interference cancellation to generate an equalized signal that includes signals received from the selected transmitter. The single-user MMSE is performed on the basis of an error variance matrix that is determined based on the LLRs and on the basis of the estimated channels obtained by the application of multi-user MMSE to pilot symbols. Multiple-user MMSE can also be applied to the received signal to equalize multiple users in parallel if multiple users have been selected for interference cancellation in the current iteration. In some embodiments, diagonal elements of the error variance matrices are approximated as a quadratic function of the LLRs. The receiver demodulates and decodes the equalized signal and updates values of the LLRs, which are fed back for use in subsequent iterations. The algorithm is iterated until symbols from all of the transmitters are successfully detected or a maximum number of iterations is reached.

FIG. 1 illustrates a first example of a wireless communication system 100 according to some embodiments. The wireless communication system 100 includes a base station 105 that provides wireless connectivity to user equipment 110, 111, 112, 113, 114, 115 (collectively referred to herein as "the users 110-115") within a geographic area or cell 120 over the corresponding air interfaces 121, 122, 123, 124, 125, 126 (collectively referred to herein as "the air interfaces 121-126"). As used herein, the term "base station" refers to any entity or device capable of providing wireless connectivity including eNodeBs, macrocells, access points, small cells, microcells, picocells, femtocells, and the like. The users 110-115 are depicted as communication devices used to facilitate communication between people, such as smart phones 110, 111, 115, cell phones 113, laptop computers 112, 114, and the like. However, as used herein, the term "user" refers to any device or entity capable of accessing network services by establishing a wireless connection over an air interface with the base station 105. For example, the users 110-115 can include physical devices such appliances, vehicles, buildings, and other items that are embedded with electronics, software, sensors, actuators, and network connectivity that enable the devices to collect and exchange data over the Internet.

The users 110-115 can transmit signals representative of symbols over the air interfaces 121-126 to the base station 105, which implements an antenna array 130 that includes one or more antennas for receiving the transmitted signals. In some cases, more than one of the users 110-115 simultaneously or concurrently transmit signals using shared resources of the air interfaces 121-126. The shared resources can include shared time-frequency resources such as slots in subcarriers in an orthogonal frequency division multiplexing (OFDM) communication system. The signals received by the antenna array 130 are therefore a superposition of the signals received from the concurrently transmitting users 110-115.

In order to efficiently decode the superposed signals from the users 110-115, the base station 105 iteratively cancels interference produced at each of the users 110-115 by the symbols transmitted by the other users 110-115 on the basis of soft decoding information such as log likelihood ratios (LLRs) that represent likelihoods that previous estimates of the symbols transmitted by the other users 110-115 are correct. The base station 105 is further configured to iteratively decode the symbols transmitted by each of the users 110-115 after canceling the interference produced by the symbols transmitted by the other users 110-115. Some embodiments of the base station 105 decodes the symbols transmitted by the users 110-115 on a user-by-user basis by selecting one of the users 110-115 for decoding during each iteration. The iterative process then proceeds on a user-by user basis until the base station 105 successfully decodes the symbols transmitted by all of the users 110-115 or until a maximum number of iterations is reached. Some embodiments of the base station 105 are able to decode the symbols transmitted by the users 110-115 on a group-by-group basis by selecting subsets of the users 110-115 for parallel decoding during each iteration. The base station 105 can therefore decode symbols transmitted by different subsets that include one or more of the users 110-115 selected for each iteration. Iterative SIC using soft decoding information is referred to herein as "Turbo-SIC."

Figure 2:
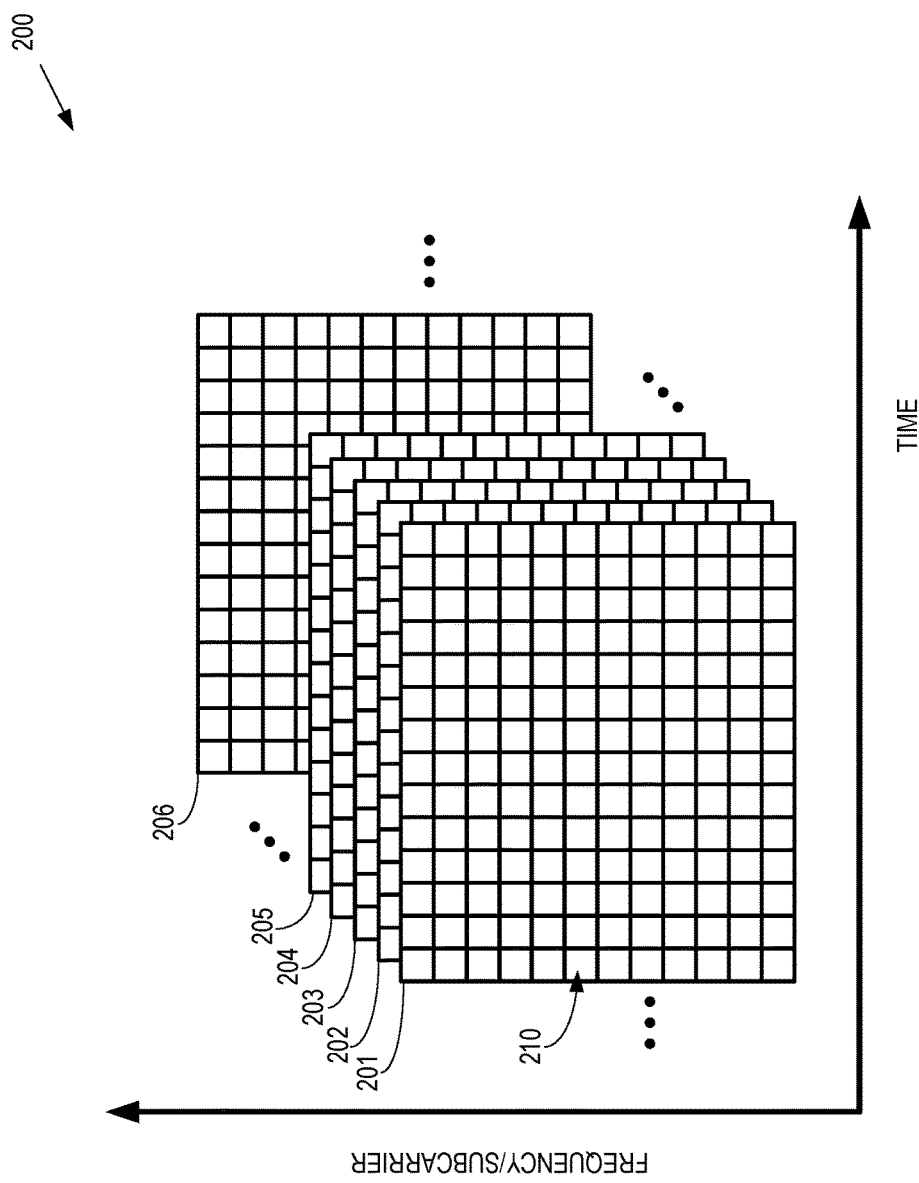
FIG. 2 illustrates a set of superposed signals produced by a plurality of users according to some embodiments.

FIG. 2 illustrates a set 200 of superposed signals produced by a plurality of users according to some embodiments. The set 200 of superposed signals can be transmitted by some embodiments of the users 110-115 shown in FIG. 1. The vertical axis represents a frequency or subcarrier of resources of the air interface and the horizontal axis represents a time interval for the resources of the air interface. The resource grids 201, 202, 203, 204, 205, 206 (collectively referred to herein as "the resource grids 201-206") illustrate the resources allocated to each of the users for transmission over the air interface.

The resource grids 201-206 for the users include resource elements 210 (only one indicated by a reference numeral in the interest of clarity). Each resource element 210 is associated with a frequency or subcarrier and a time interval that is used to convey one symbol. The resource grids 201-206 can be divided into frames, subframes, slots, and symbols. For example, a frame can have a duration of 10 milliseconds (ms) and include 10 subframes that each have a duration of 1 ms. Each subframe can be subdivided into two slots having durations of 0.5 ms and each slot can be subdivided into seven symbols. As shown in FIG. 2, the resources of the air interface are shared between the users and each of the users is able to transmit simultaneously or concurrently using the corresponding resource grids 201-206.

Figure 3:
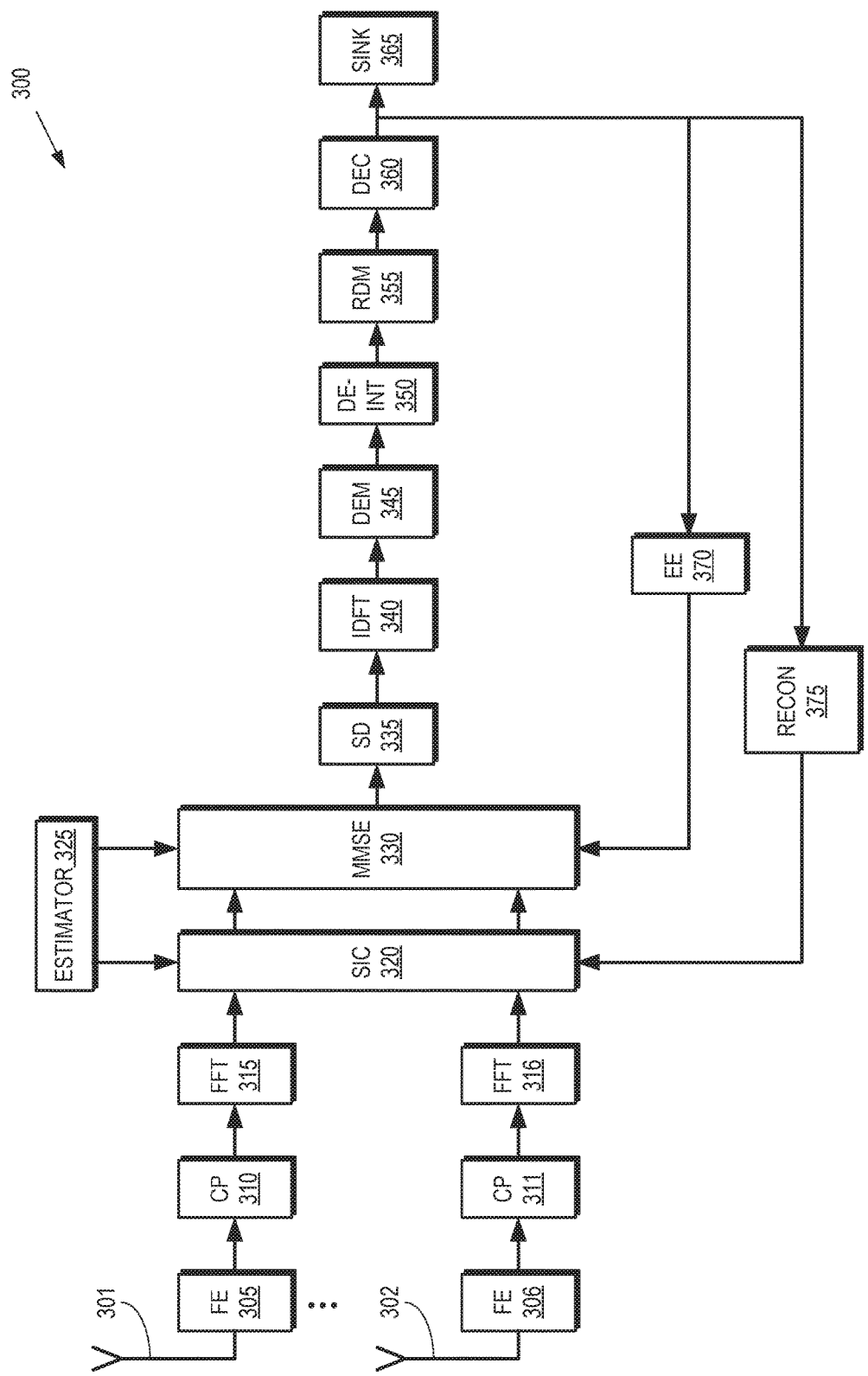
FIG. 3 is a block diagram of a receiver that implements successive interference cancellation using soft decoder feedback according to some embodiments.

FIG. 3 is a block diagram of a receiver 300 that implements Turbo-SIC according to some embodiments. The receiver 300 is implemented in some embodiments of the base station 105 or the user equipment 110-115 shown in FIG. 1. Some embodiments of the receiver 300 are configured to decode signals that are encoded according to single channel-frequency division multiple access (SC-FDMA) modulation. The receiver 300 includes a plurality of antennas 301, 302. For example, the receiver 300 can be configured to receive signals from a number (P) of antennas in an antenna array such as the antenna array 130 shown in FIG. 1. As discussed herein, the antennas 301, 302 can receive superposed signals from a plurality of users that are concurrently transmitting symbols over the air interface using shared resources.

The receiver 300 includes front-end modules 305, 306 that are connected to the corresponding antennas 301, 302 so that the front-end modules 305, 306 receive signals in response to the antennas 301, 302 receiving the superposed signals. Cyclic prefixes are introduced between blocks of symbols transmitted by the users. The cyclic prefixes repeat portions of the symbols. The front-end modules 305, 306 provide the received signals to cyclic prefix modules 310, 311, which are configured to remove the cyclic prefixes from the received signals. After removing the cyclic prefixes, the cyclic prefix modules 310, 311 provide the received signals to fast Fourier transform (FFT) modules 315, 316, which are configured to perform an M-point FFT on the received signals to convert the received signals into the frequency domain. The frequency components of the signals generated by the FFT modules 315, 316 correspond to the number (M) of subcarriers allocated to the shared resources of the air interface. In the interest of clarity, only two chains of modules are depicted in FIG. 3. A first chain links antenna 301 to front-end module 305 to cyclic prefix module 310 to FFT module 315. A second chain links antenna 302 to front-end module 306 to cyclic prefix module 311 to FFT module 316. However, the number of chains in the receiver 300 is determined by the number of antennas 301, 302 so that there is one chain for each antenna and each chain generates corresponding frequency components.

A successive interference cancellation (SIC) module 320 receives the frequency components of the signals generated by the FFT modules 315, 316 and performs iterative cancellation of interference at each of the users caused by the other users that concurrently transmit symbols as part of the superposed signal received at the antennas 301, 302. Some embodiments of the SIC module 320 perform iterative interference cancellation by selecting one of the users and canceling interference at the selected one of the users based on soft decoding information such as LLRs that were determined for one or more of the users during a previous iteration. For example, the SIC module 320 can perform the iterative interference cancellation for the selected user based on soft symbols that are reconstructed based on the LLRs. The SIC module 320 also uses channels estimated by multi-user MMSE to perform the iterative interference cancellation for the selected user. Once the iteration is complete for the selected user, another user is selected for interference cancellation. Some embodiments of the SIC module 320 are configured to perform iterative interference cancellation by selecting subsets of the users and canceling interference at the selected subsets of the users based on soft decoding information such as LLRs that were determined for one or more of the users during a previous iteration. The iterative Turbo-SIC process implemented by the SIC module 320 is discussed in more detail below.

A channel estimator 325 is used to generate a channel estimate by applying multi-user MMSE to pilot symbols received from the users. Multi-user MMSE is distinguished from single-user MMSE because single-user MMSE derives channels between a single user and a receiver on the basis of pilot symbols received from the single-user. Thus, in a single-user MMSE, channels between different users and the receiver are independently computed based on the pilot symbols received from the different users. In contrast, in multi-user MMSE, channels between different users and the receivers are jointly computed on the basis of all the pilot symbols received from different users using a combined statistical representation of the signals received from the users. For example, channel estimates for multi-user MMSE can be calculated using approximate second order statistics for the pilot signals, e.g., using the expression in equation (16) below. The channel estimator 325 provides channel estimates to the SIC module 320.

A single-user MMSE equalizer 330 receives signals from the SIC module 320 that represent values of the frequency components in the received signal after subtracting an estimate of interference caused by the other users. Thus, the signals received by the single-user MMSE equalizer 330 are an estimate of the frequency components of the user that has been selected for SIC and decoding during the current iteration. The single-user MMSE equalizer 330 receives channel estimates from the channel estimator 325. The single-user MMSE equalizer 330 also receives error variance matrices associated with each frequency component. The error variance matrices are generated based on soft decoding information such as LLRs that were determined for one or more of the users during a previous iteration. The single-user MMSE equalizer 330 generates equalized signals that represent an estimate of the symbols transmitted by the user selected for the current iteration based on the channel estimates and the error variance matrices, as discussed in more detail below. Some embodiments of the receiver 300 replace the single-user MMSE equalizer 330 with a multiple-user MMSE equalizer to support performing Turbo-SIC on a group-by-group basis, as discussed herein.

The equalized signals are provided to a sub-channel de-mapper 335, an N-point inverse discrete Fourier transform (IDFT) module 340, a soft demodulator 345, a de-interleaver 350, and a rate de-match module 355. The elements 335, 340, 345, 350, 355 are known in the art and, in the interest of clarity, are not discussed in detail herein. The rate de-match module 355 provides the processed signals to a decoder 360 that produces soft decoding information such as LLRs. For example, the decoder 360 can implement convolutional decoders to perform turbo decoding, low density parity check (LDPC) coding, and the like. The decoder 360 generates a set of bits that represent an estimate of the bits that are encoded in the signal received by the decoder 360. The decoder 360 also generates a corresponding set of LLRs that represents likelihoods that each of the estimated bits is the correct value of the corresponding bit in the encoded signal. The decoder 360 can determine whether the bits have been correctly decoded using techniques such as performing a cyclic redundancy check (CRC) on the decoded bits. The decoded bits can be provided to a bit sink 365. The LLRs are fed back for use in subsequent iterations used to continue decoding signals for the currently selected user or for decoding signals for subsequently selected users in subsequent iterations.

An error estimator 370 receives the LLRs from the decoder 360 and uses the feedback LLRs to generate or update an error variance matrix. Some embodiments of the error estimator 370 generate or update the error variance matrix using values of diagonal elements of the error variance matrix that are determined based on a quadratic function of the LLRs, as discussed in more detail below. The error variance matrix is then provided to the single-user MMSE equalizer 330.

A signal reconstruction module 375 receives the LLRs from the decoder 360 and uses the feedback LLRs to reconstruct soft symbols that are estimates of the symbols transmitted by the users in the superposed signal, as discussed in more detail below. The reconstructed soft symbols are then provided to the SIC module 320.

Figure 4:
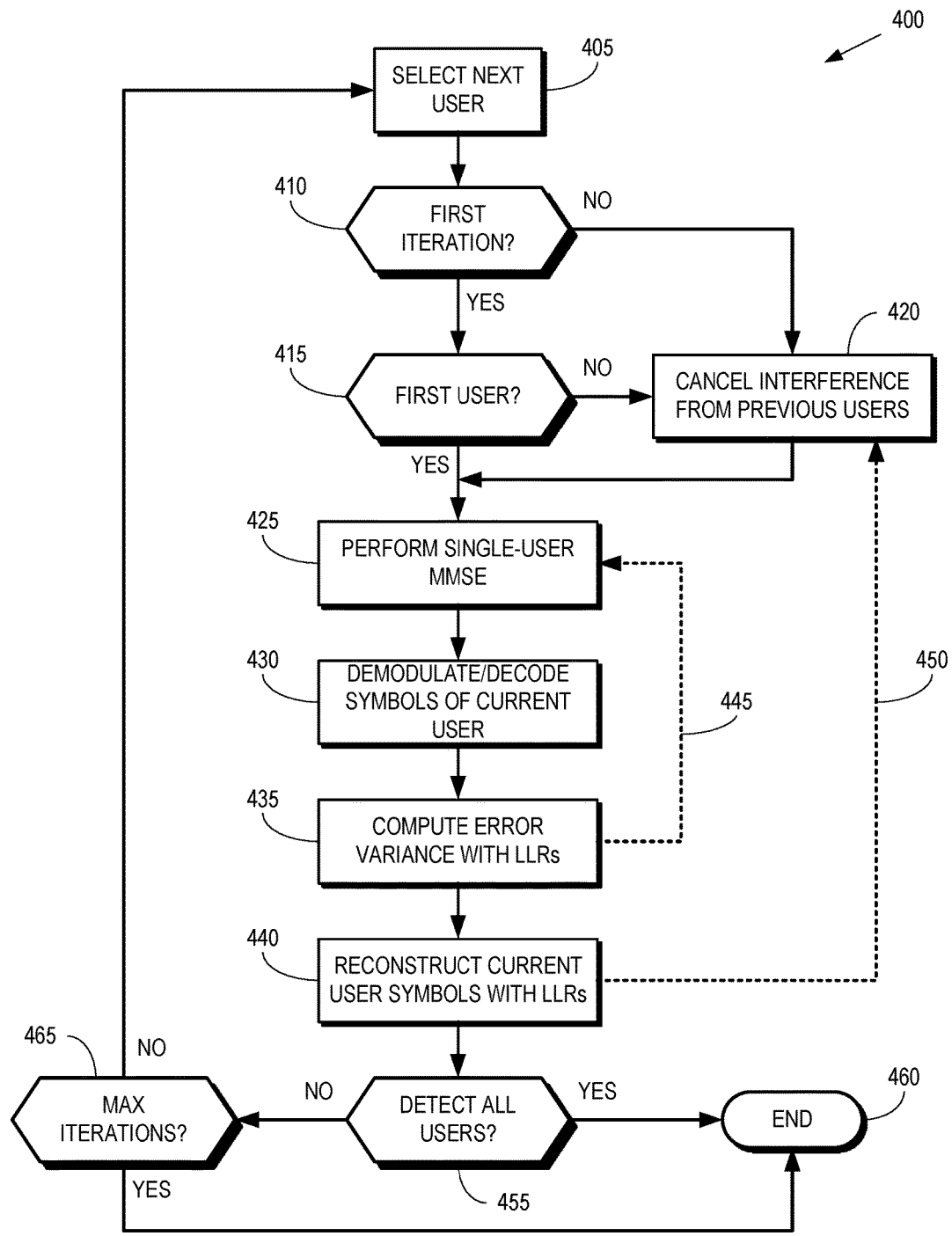
FIG. 4 is a flow diagram of a method of performing successive interference cancellation (SIC) on a received signal that is a superposition of symbols transmitted by a plurality of users according to some embodiments.

FIG. 4 is a flow diagram of a method 400 of performing successive interference cancellation (SIC) on a received signal that is a superposition of symbols transmitted by a plurality of users according to some embodiments. The method 400 is implemented in some embodiments of the base station 105 shown in FIG. 1, the user equipment 110-115 shown in FIG. 1, and the receiver 300 shown in FIG. 3. The method 400 performs SIC on a combined signal received from a number (K) of users that are concurrently transmitting using shared resources of the air interface. Prior to executing the method 400, some embodiments of the receiver determine the number (K) of users, the total number of iterations that are used to attempt to decode the symbols received from the users, and an order in which the users are to be decoded. The frequency-domain signal received by the P receive antennas of the receiver can be modeled as:

$$Y_m = \sum_{l=1}^{K} h_m^{(l)} x_m^{(l)} + n_m, \quad (1)$$

where m is the subcarrier index, K is the number of users transmitting concurrently on the same/shared resources, $h_m^{(l)}$ is the P×1 vector containing the frequency-domain channel coefficients for the subcarrier m of user l, $x_m^{(l)}$ is the symbol transmitted by user l on subcarrier m, and $n_m$ is the P×1 noise vector for subcarrier m.

At block 405, the receiver selects a user for decoding. For example, the receiver can select the first user indicated by the decoding order at the first iteration. In subsequent iterations, the receiver selects other users in the order indicated by the decoding order.

At decision block 410, the receiver determines whether it is performing the first iteration of the method 400. If so, the method 400 flows to decision block 415. If not, the method 400 flows to block 420.

At decision block 415, the receiver determines whether the method 400 is operating on the first user. If so, the method 400 bypasses block 420 and flows to block 425. If not, the method 400 flows to block 420.

At block 420, the receiver cancels interference in the received signal from previous users, e.g., using estimates of the interference for users that are determined based on values of the LLRs that were determined in previous iterations of the method 400. For example, after K−1 users have been detected in the i-th iteration, the signal of the user k in the i-th iteration after cancellation of all other interfering users can be written as:

$$Y_m^{(k,i)} = h_m^{(k)} x_m^{(k)} + \sum_{l=1, l \neq k}^{K} h_m^{(l)}(x_m^{(l)} - \tilde{x}_m^{(l,i)}) + n_m, \quad (2)$$

where $\tilde{x}_m^{(l,i)}$ is the soft-modulated reconstructed symbol of the user l on subcarrier m in the i-th iteration. Note that the interference cancellation operations in the i-th iteration, i.e., $(Y_m^{(i)} - \tilde{h}_m^{(l)} \tilde{x}_m^{(l,i)})$, for $1 \leq l \leq K$, are referenced in the summation of equation (2) and they are performed in block 420 using channel estimates such as the channel estimates $\tilde{h}_m^{(l)}$ computed using multi-user MMSE and the reconstructed symbols $\tilde{x}_m^{(l,i)}$, which are computed in block 440, as discussed below.

At block 425, the receiver performs single-user MMSE to derive estimated values of the symbols transmitted by the user. For example, the MMSE solution for the estimated values of the symbols transmitted by user k in the i-th iteration can be written as:

$$\hat{x}_m^{(k,i)} = [w_m^{(k,i)}]^H \cdot Y_m^{(k,i)}, \quad (3)$$

with:

$$w_m^{(k,i)} = (\tilde{H}_m Q_m^{(i)} \tilde{H}_m^H + \sigma^2 I)^{-1} \tilde{h}_m^{(k)} P_m^{(k)}, \quad (4)$$

where $\tilde{H}_m$ is a P×K matrix with the $\tilde{h}_m^{(k)}$ as columns, i.e., col $[\tilde{H}_m]_k := \tilde{h}_m^{(k)}$. Moreover, $P_m^{(k)} := \mathbb{E}\{|x_m^{(k)}|^2\}$ and $\sigma^2$ is the noise variance. The error variance matrix $Q_m^{(i)}$ is the diagonal K×K error variance matrix for i-th iteration, which is defined as, $Q_m^{(i)} := \text{diag}(q_m^{(1,i)}, \ldots, q_m^{(K,i)})$, with $q_m^{(k,i)} := \mathbb{E}\{|x_m^{(k)} - \tilde{x}_m^{(k,i)}|^2\}$. The error variance matrix, $Q_m^{(i)}$, is determined in block 435, as discussed below.

At block 430, the receiver demodulates and decodes symbols received in the signal from the current user for the current iteration. Demodulation is performed in some embodiments of the soft demodulation block 345 shown in FIG. 3 and decoding is performed in some embodiments of the decoder 360 shown in FIG. 3. The output of the decoding process includes estimates of the decoded symbols transmitted by the current user and LLRs that provide a measure of the likelihood that the decoded symbols are correct, i.e., they are the same as the symbols transmitted by the current user.

At block 435, the receiver computes the error variance matrix based on the LLRs of the decoded symbols. The receiver could compute the error variance matrices $Q_m^{(i)}$ using analytical expressions based on second order statistics. However, the complexity of the computation based on second order statistics increases exponentially with the constellation size. Thus, some embodiments of the receiver compute the error variance matrices $Q_m^{(i)}$ using analytical approximations that result in far less complexity and improved performance. For example, the elements $q_m^{(k,i)}$ on the diagonal of $Q_m^{(i)}$ can be computed as:

$$q_m^{(k,i)} = a \cdot (\Lambda^2 - 4.15\Lambda + 4.29), \text{ with:} \quad (5)$$

-continued $$\Lambda = \log_{10}\left[\frac{1}{W}\sum_{j=1}^{W}|\lambda_j|\right], \quad (6)$$

where $\lambda_j$, $1 \leq j \leq W$, are the LLRs at the output of the channel decoder that correspond to a codeword of length W. Moreover, the parameter a in equation (5) can be selected to fine-tune the computation of error variances $q_m^{(k,i)}$ such that performance is optimized under the diverse scenarios in which SIC is applied as discussed herein. The values of the error variance matrices are then fed back to block 425, as indicated by the arrow 445.

At block 440, the receiver reconstructs soft estimates of the symbols transmitted by the current user based on the LLRs. In some embodiments, the receiver reconstructs the soft-modulated symbols $\tilde{x}_m^{(l,i)}$ using the LLRs ($\lambda_j$) from the output of the channel decoder (e.g., the turbo decoder 360 shown in FIG. 3), which are computed in block 430. In the case of SC-FDMA modulation, the operations to compute $\tilde{x}_m^{(l,i)}$ are as follows:

$$\tilde{s}_m^{(k,i)} = \sum_{l \in \mathcal{A}} a_l \mathbb{P}\{s_m^{(k,i)} = a_l\}, \text{ with} \quad (7)$$

$$\mathbb{P}\{s_m^{(k,i)} = a_l\} = \prod_{j=1}^{\log_2|\mathcal{A}|} \mathbb{P}\{bit_j[s_m^{(k,i)}] = bit_j[a_l]\}, \text{ and} \quad (8)$$

$$\mathbb{P}\{bit_j[s_m^{(k,i)}] = 0\} = \frac{1}{(1+e^{\lambda_j})}, \text{ and} \quad (9)$$

$$\mathbb{P}\{bit_j[s_m^{(k,i)}] = 1\} = \frac{\lambda_j}{(1+e^{\lambda_j})}, \quad (10)$$

where A represents the set of all symbols pertaining to a modulation format, $a_L$ is a symbol in the set A, and the operator $bit_j[x]$ selects the j-th bit of symbol x. The receiver computes the soft estimation of the symbol, $\tilde{x}_m^{(l,i)}$, by performing an N-point FFT on a vector of $\tilde{s}_m^{(l,i)}$. For example, the soft estimation of the symbol, $\tilde{x}_m^{(l,i)}$, can be written as:

$$(\tilde{x}_1^{(l,i)}, \ldots, \tilde{x}_N^{(l,i)}) = \text{FFT}_N[(\tilde{s}_1^{(l,i)}, \ldots, \tilde{s}_N^{(l,i)})]. \quad (11)$$

The soft estimates of the symbols for the current user are then fed back to the block 420, as indicated by the arrow 450.

At decision block 455, the receiver determines whether all of the users have been detected. Detection of the users can be confirmed based on cyclic redundancy check (CRC) information included in the decoded symbols. If all the users have been detected, the method 400 flows to terminator 460 and the method 400 ends. If not all of the users have been detected, the method 400 flows to decision block 465.

At decision block 465, the receiver determines whether the maximum number of iterations has been reached. If so, the method 400 flows to terminator 460 and the method 400 ends. If not, the method 400 flows to block 405 and the next user indicated by the order of users is selected and another iteration of the method 400 begins.

Figure 5:
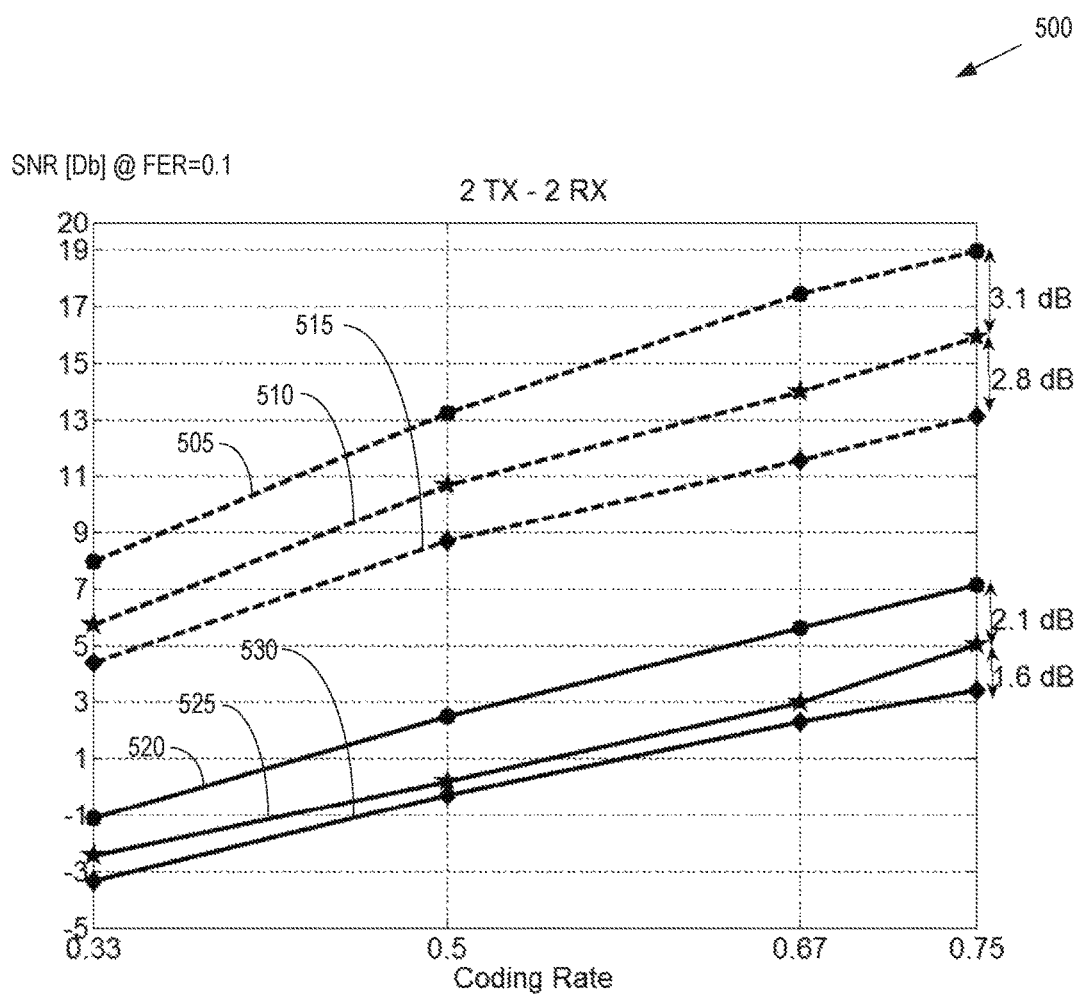
FIG. 5 is a first plot that compares performance of some embodiments of iterative SIC based on soft decoding information against the performance of conventional multi-user detection techniques including linear MMSE and conventional non-iterative SIC based on hard bits obtained from output of a channel decoder.

FIG. 5 is a first plot 500 that compares performance of some embodiments of Turbo-SIC against the performance of conventional multi-user detection techniques including linear MMSE and conventional non-iterative SIC based on hard bits obtained from output of a channel decoder. The vertical axis indicates the signal-to-noise ratio (SNR) required to achieve a frame error rate (FER) of 0.1 and the horizontal axis indicates the coding rate applied to the transmitted symbols. The plot 500 illustrates performance in a system that includes two transmission (TX) antennas and two receive (RX) antennas, e.g., K=2 and P=2. The channel model used for the simulation results includes frequency selective Rayleigh fading and assumes that the channels between pairs of transmitter and receiver antennas are independent from each other.

The lines 505, 510, 515 are computed for 16 QAM modulation. The line 505 represents the required SNR to achieve an FER of 0.1 for conventional linear MMSE and the line 510 represents the required SNR to achieve an FER of 0.1 for conventional non-iterative SIC based on hard bits obtained from output of a channel decoder. The line 515 represents the required SNR to achieve an FER of 0.1 for Turbo-SIC, e.g., according to some embodiments of the method 400 shown in FIG. 4. The lines 505, 510, 515 illustrate that embodiments of the techniques disclosed herein achieve approximately a 6 dB improvement over linear MMSE and approximately a 3 dB improvement over conventional non-iterative SIC based on hard bits obtained from output of a channel decoder on symbols encoded using 16 QAM.

The lines 520, 525, 530 are computed for QPSK modulation. The line 520 represents the required SNR to achieve an FER of 0.1 for conventional linear MMSE and the line 525 represents the required SNR to achieve an FER of 0.1 for conventional non-iterative SIC based on hard bits obtained from output of a channel decoder. The line 530 represents the required SNR to achieve an FER of 0.1 for Turbo-SIC, e.g., according to some embodiments of the method 400 shown in FIG. 4. The lines 520, 525, 530 illustrate that embodiments of the techniques disclosed herein achieve approximately a 3.5 dB improvement over linear MMSE and approximately a 1.5 dB improvement over conventional non-iterative SIC based on hard bits obtained from output of a channel decoder on symbols encoded using QPSK.

Figure 6:
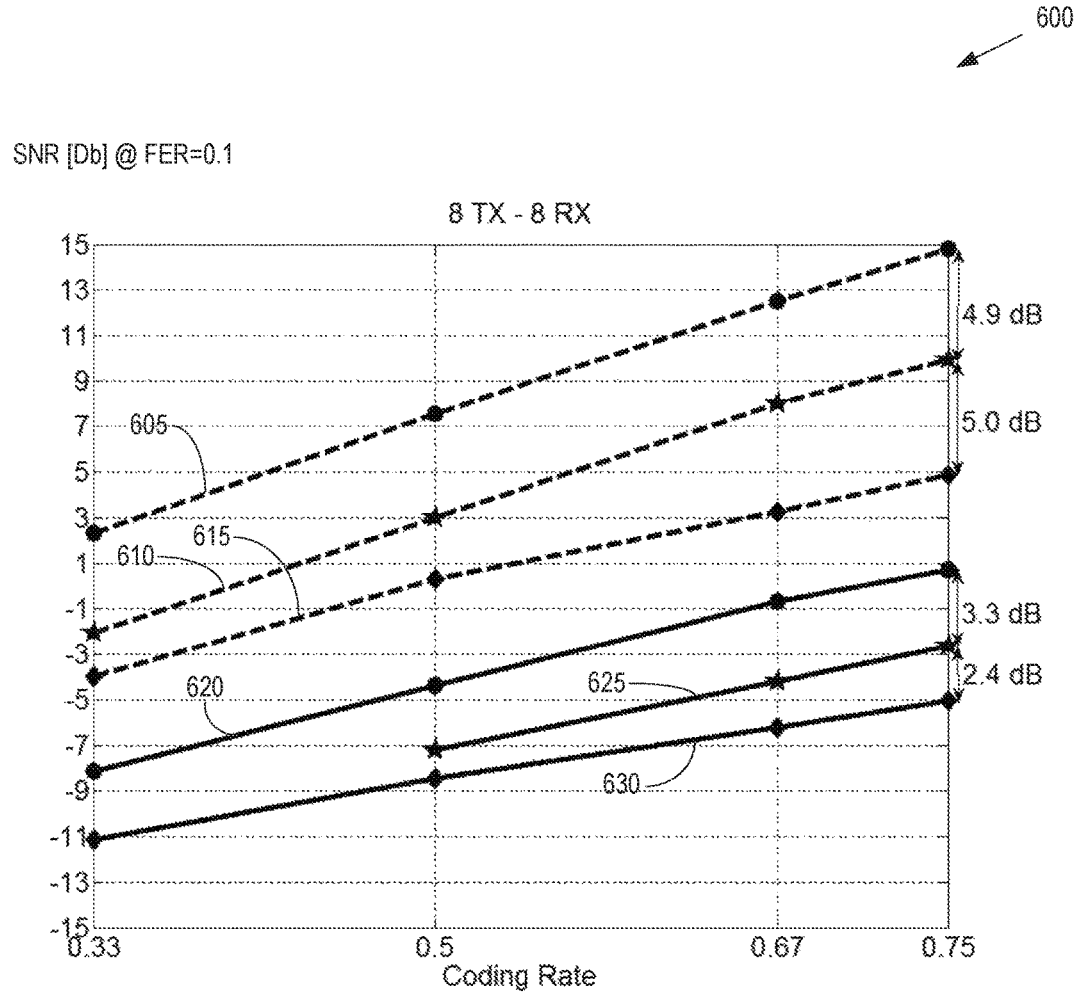
FIG. 6 is a second plot that compares performance of some embodiments of iterative SIC based on soft decoding information against the performance of conventional multi-user detection techniques including linear MMSE and conventional non-iterative SIC based on hard bits obtained from output of a channel decoder.

FIG. 6 is a second plot 600 that compares performance of some embodiments of Turbo-SIC against the performance of conventional multi-user detection techniques including linear MMSE and conventional non-iterative SIC based on hard bits obtained from output of a channel decoder. The vertical axis indicates the signal-to-noise ratio (SNR) required to achieve a frame error rate (FER) of 0.1 and the horizontal axis indicates the coding rate applied to the transmitted symbols. The plot 600 illustrates performance in a system that includes eight transmission (TX) antennas and eight receive (RX) antennas, e.g., K=8 and P=8. The channel model used for the simulation results includes frequency selective Rayleigh fading and assumes that the channels between pairs of transmitter and receiver antennas are independent from each other.

The lines 605, 610, 615 are computed for 16 QAM modulation. The line 605 represents the required SNR to achieve an FER of 0.1 for conventional linear MMSE and the line 610 represents the required SNR to achieve an FER of 0.1 for conventional non-iterative SIC based on hard bits obtained from output of a channel decoder. The line 615 represents the required SNR to achieve an FER of 0.1 for Turbo-SIC, e.g., according to some embodiments of the method 400 shown in FIG. 4. The lines 605, 610, 615 illustrate that embodiments of the techniques disclosed herein achieve approximately a 10 dB improvement over linear MMSE and approximately a 5 dB improvement over conventional non-iterative SIC based on hard bits obtained from output of a channel decoder on symbols encoded using 16 QAM.

The lines 620, 625, 630 are computed for QPSK modulation. The line 620 represents the required SNR to achieve an FER of 0.1 for conventional linear MMSE and the line 625 represents the required SNR to achieve an FER of 0.1 for conventional non-iterative SIC based on hard bits obtained from output of a channel decoder. The line 630 represents the required SNR to achieve an FER of 0.1 for Turbo-SIC, e.g., according to some embodiments of the method 400 shown in FIG. 4. The lines 620, 625, 630 illustrate that embodiments of the techniques disclosed herein achieve approximately a 5.5 dB improvement over linear MMSE and approximately a 2.5 dB improvement over conventional non-iterative SIC based on hard bits obtained from output of a channel decoder on symbols encoded using QPSK.

Figure 7:
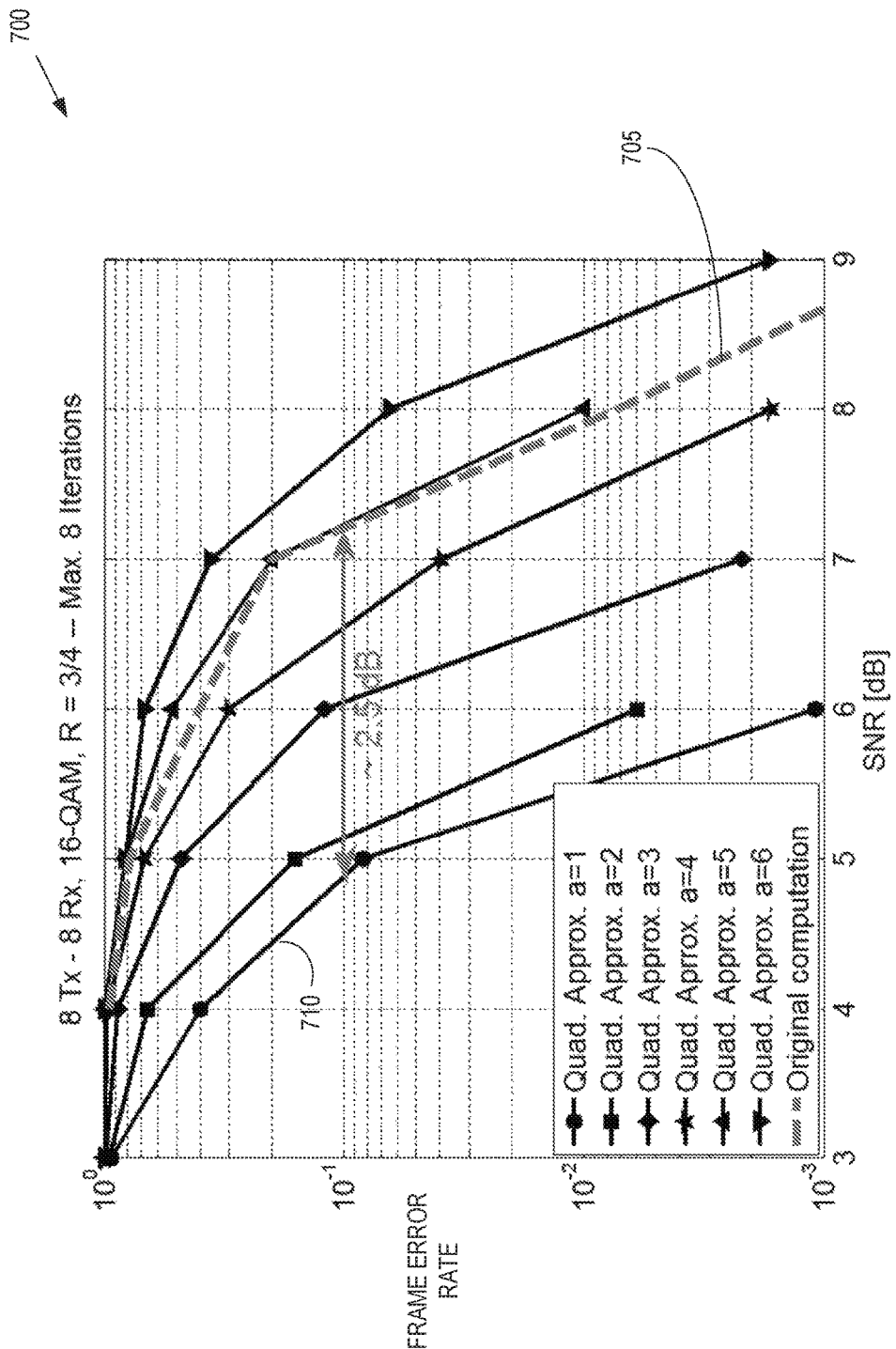
FIG. 7 is a plot illustrating the effect of optimizing the error variance in some embodiments of iterative SIC based on soft decoding information.

FIG. 7 is a plot 700 illustrating the effect of optimizing the error variance in some embodiments of Turbo-SIC. The vertical axis indicates an FER and the horizontal axis indicates an SNR in dB. The number of transmitters is K=8, the number of receive antennas is P=8. The channel model assumes Rayleigh fading with independent links between each pair of transmitter and receiver antennas. The symbols are encoded using 16 QAM modulation at a rate of 3/4. Some embodiments of the iterative SIC algorithm perform a maximum of eight iterations per user, e.g., iterations of the method 400 shown in FIG. 4. The error variance is computed according to equations (5) and (6) and the different curves in the plot 700 represent calculations assuming different values of the parameter a. The "Original" curve 705 represents the more complex calculations performed using second-order statistics. The remaining curves illustrate results using the analytical approximation represented by equations (5) and (6). The best result is represented by the curve 710, which is achieved by setting a=1 in equation (5), which at an FER of 0.1 is about 2.5 dB better than the results obtained by applying the more complex computation of the error variance that uses second order statistics. Thus, the parameter a can be selected based on the system configuration to provide optimal performance.

Figure 8:
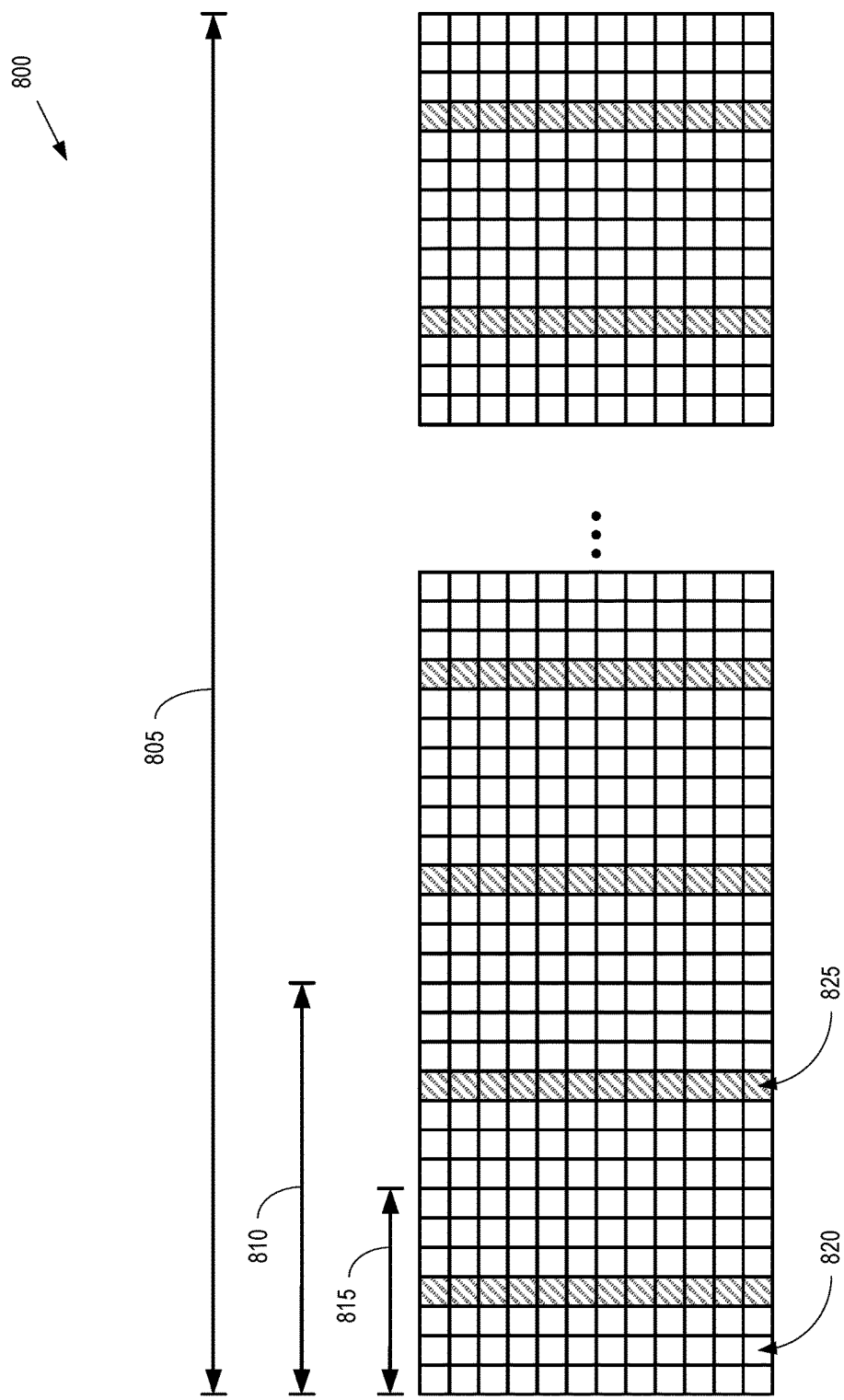
FIG. 8 is a block diagram of a frame structure used to define channels of an air interface according to some embodiments.

FIG. 8 is a block diagram of a frame structure 800 used to define channels of an air interface according to some embodiments. The frame structure 800 is used for transmission over some embodiments of the air interfaces 121-126 shown in FIG. 1 and corresponds to some embodiments of the resource grids 201-206 shown in FIG. 2. The channels of the frame structure 800 are defined in terms of frequencies or subcarriers (in the vertical direction) and time intervals (and the horizontal direction). The illustrated embodiment of the frame structure 800 includes 12 subcarriers. The frame structure 800 illustrates a single frame 805 that is subdivided into 10 subframes and 20 slots. The duration of the single frame 805 is 10 ms. A subframe 810 is subdivided into two slots and has a duration of 1.0 ms. A slot 815 has a duration of 0.5 ms and is subdivided into seven symbols 820 (only one symbol indicated by a reference numeral in the interest of clarity). The crosshatched symbols 825 (only one indicated by a reference numeral in the interest of clarity) are reserved for the transmission of pilot symbols.

Figure 9:
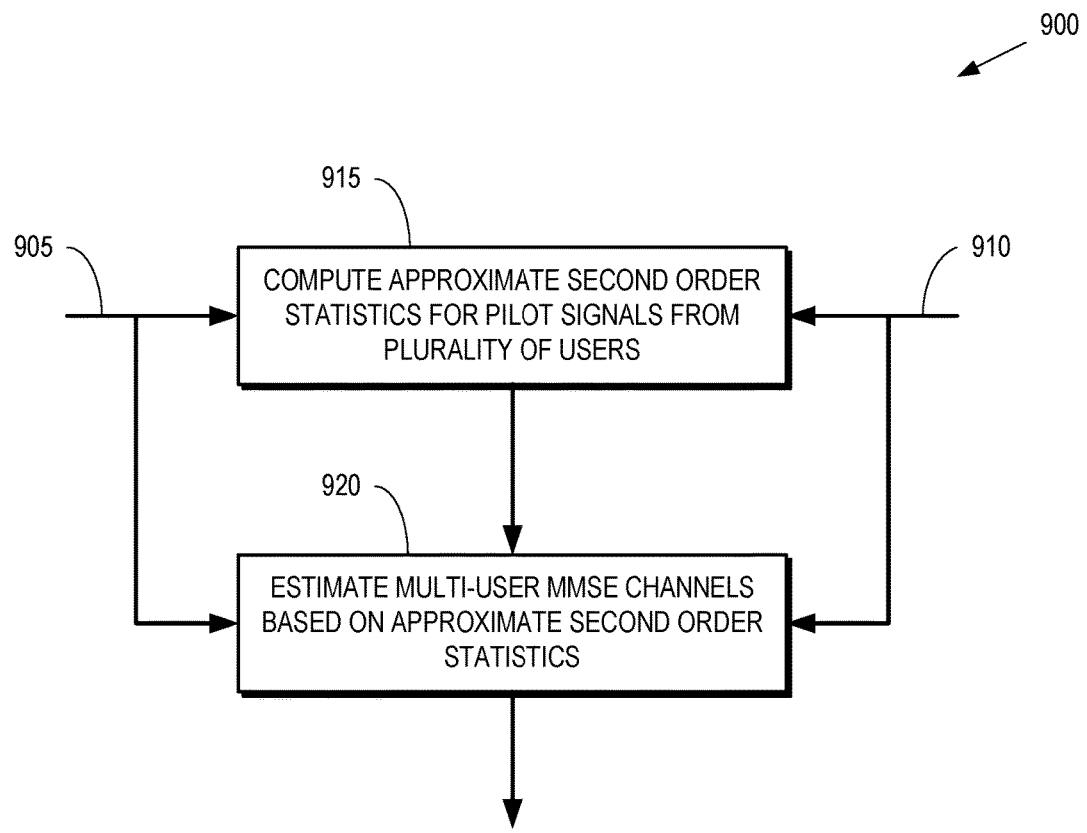
FIG. 9 is a flow diagram of a method of channel estimation using multi-user MMSE according to some embodiments.

FIG. 9 is a flow diagram of a method 900 of channel estimation using multi-user MMSE according to some embodiments. The method 900 is implemented in some embodiments of the channel estimator 325 shown in FIG. 3. The method 900 receives input 905 that represents the known values of the transmitted pilot symbols and input 910 from the FFT modules 315, 316 shown in FIG. 3. For example, the input 910 can represent the frequency domain signal for the pilot symbols transmitted by each of the users as:

$$T_n(l) = \sum_{u=1}^{K} r(l,u)h_n(l,u) + Z_n(l), \text{ for} \quad (12)$$

$$1 \leq l \leq L \Longrightarrow T_n = \sum_{u=1}^{K} r(u)h_n(u) + Z_n$$

where $r(l,k)$ is the pilot symbol transmitted by user k on subcarrier l, $h_n(l,k)$ is the channel coefficient for user k on subcarrier l and antenna port n, $Z_n(l)$ is the thermal noise on subcarrier l and antenna port n. The quantities $T_n$, $r(k)$, $h_n(k)$ and $Z_n$ are the equivalent L-dimensional vectors representing the symbols on the left hand side of equation (12) over L subcarriers. Furthermore, the right hand side of equation (12) can be arranged to highlight the received pilots for user k:

$$T_n = r(k)h_n(k) + \sum_{u=1, u \neq k}^{K} r(u)h_n(u) + Z_n. \quad (13)$$

The multi-user MMSE solution for the channel estimates of the user k is derived from equation (13) as:

$$\hat{h}_n(l,k) = \quad (14)$$

$$\mathbb{E}\{h_n(l,k)h_n^H(k)\}r^H(k)\left[\sum_{u=1}^{K} r(u)\mathbb{E}\{h_n(u)h_n^H(u)\}r^H(u) + \sigma_Z^2 I_L\right]^{-1} T_n$$

where $\sigma_Z^2$ is the noise variance and $I_L$ is the L-dimensional identity matrix. Note that the solution presented in equation (14) requires knowledge of the channel's second order statistics, which increases the overall complexity of the estimator. Thus, a simplification of the estimator in equation (14) can be achieved by the following expression:

$$\hat{h}_n(l,k) = \begin{pmatrix} |\bar{h}_n(k)|^2 \\ \vdots \\ |\bar{h}_n(k)|^2 \end{pmatrix}^T \quad (15)$$

$$r^H(k)\left[\sum_{u=1}^{K} r(u) \begin{pmatrix} |\bar{h}_n(u)|^2 & \cdots & |\bar{h}_n(u)|^2 \\ \vdots & \ddots & \vdots \\ |\bar{h}_n(u)|^2 & \cdots & |\bar{h}_n(u)|^2 \end{pmatrix} r^H(u) + \sigma_Z^2 I_L\right]^{-1} T_n \text{ with:}$$

$$\bar{h}_n(u) = \frac{1}{L}\sum_{l=1}^{L}\frac{r^*(l,u)T_n(l)}{|r(l,u)|^2} \text{ and } |\bar{h}_n(u)|^2 = \bar{h}_n(u)\bar{h}_n^*(u). \quad (16)$$

Note that the channel estimates $\tilde{h}_m^{(k)}$ used in equation (4) are composed of the MMSE estimates $\hat{h}_m(l,k)$ using the following expression:

$$\tilde{h}_m^{(k)} = [\hat{h}_1(m,k), \hat{h}_2(m,k), \ldots, \hat{h}_P(m,k)]. \quad (17)$$

Thus, the method 900 computes approximate second-order statistics for the pilot signals from the plurality of users at block 915 based on the expression shown in equation (16). The approximate second-order statistics are then provided to block 920. The method 900 uses the approximate second-order statistics to estimate multi-user MMSE channels for the plurality of users based on equation (15) in block 920.

Figure 10:
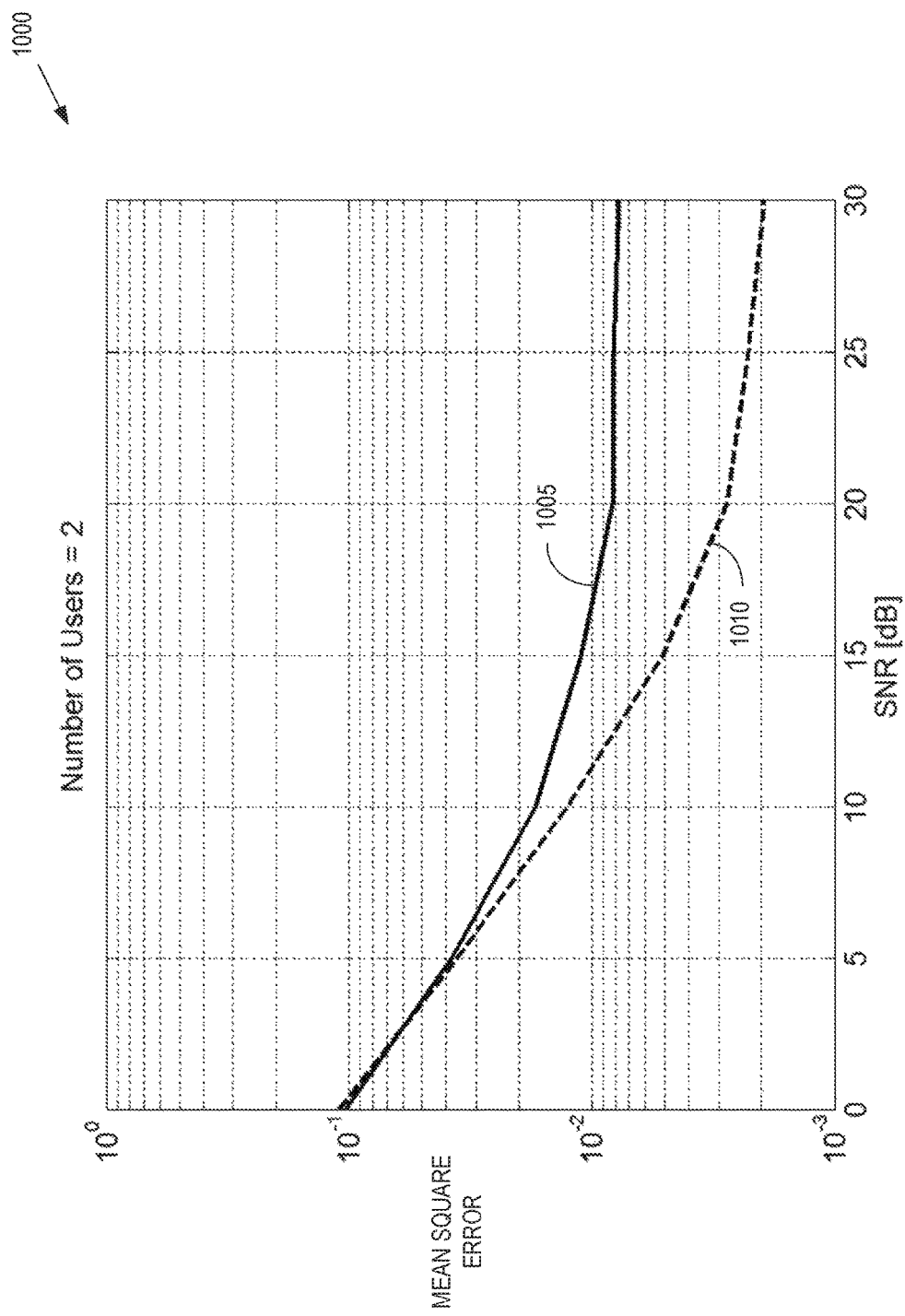
FIG. 10 is a plot illustrating a comparison between performance of some embodiments of multi-user MMSE channel estimation and conventional least-squares channel estimation.

FIG. 10 is a plot 1000 illustrating a comparison between performance of some embodiments of multi-user MMSE channel estimation and conventional least-squares channel estimation. The vertical axis indicates the mean square error of the channel estimate and the horizontal axis indicates the SNR in dB. The plot 1000 represents results of a simulation of operation of a multi-user MMSE channel estimator according to some embodiments of the method 900 shown in FIG. 9. The simulation utilizes K=2 users and L=11. The line 1005 represents the mean square error for conventional least-squares channel estimation and the line 1010 represents the mean square error for multi-user MMSE channel estimation. The lines 1005, 1010 diverge near an SNR of approximately 5 dB and the multi-user MMSE channel estimation provides a lower mean square error at higher SNR. Thus, multi-user MMSE channel estimation provides the same mean square error at lower SNR than conventional least-squares channel estimation. However, at a mean square error of 0.01, the multi-user MMSE channel estimation technique provides approximately 5 dB of gain over the conventional least-squares estimator.

Figure 11:
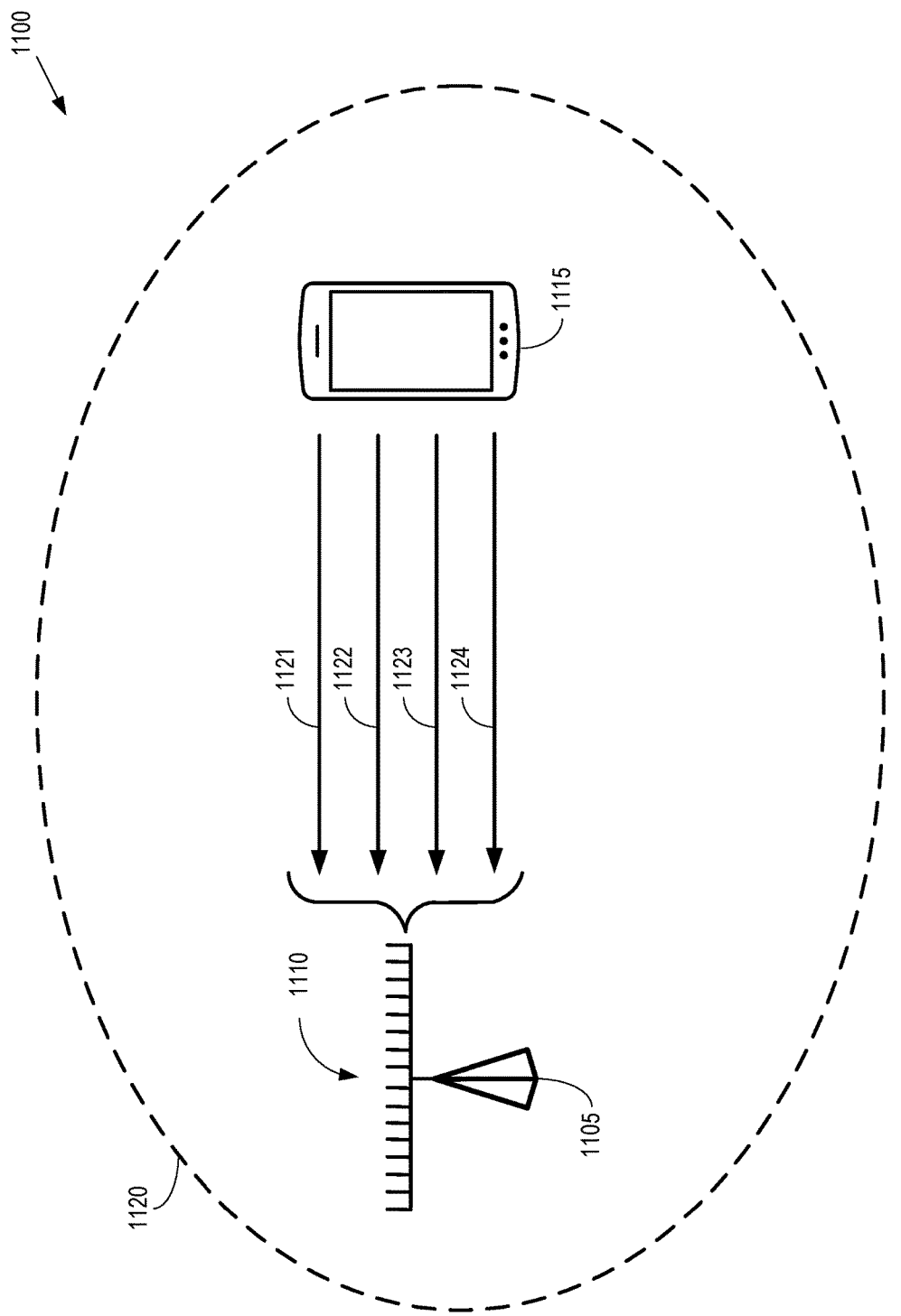
FIG. 11 illustrates a second example of a wireless communication system according to some embodiments.

FIG. 11 illustrates a second example of a wireless communication system 1100 according to some embodiments. The wireless communication system 1100 includes a base station 1105 that implements an antenna array 1110 to provide wireless connectivity to user equipment 1115 within a cell 1120. The base station 1105 and the user equipment 1115 are configured to perform single user, multiple-input-multiple-output (SU-MIMO) wireless communication. For example, the user equipment 1115 is configured to transmit K independent uplink data streams 1121, 1122, 1123, 1124 concurrently on the same time-frequency resources. The base station 1105 implements a receiver (such as the receiver 300 shown in FIG. 3) to perform Turbo-SIC on the K independent uplink data streams 1121, 1122, 1123, 1124, as discussed herein.

Figure 12:
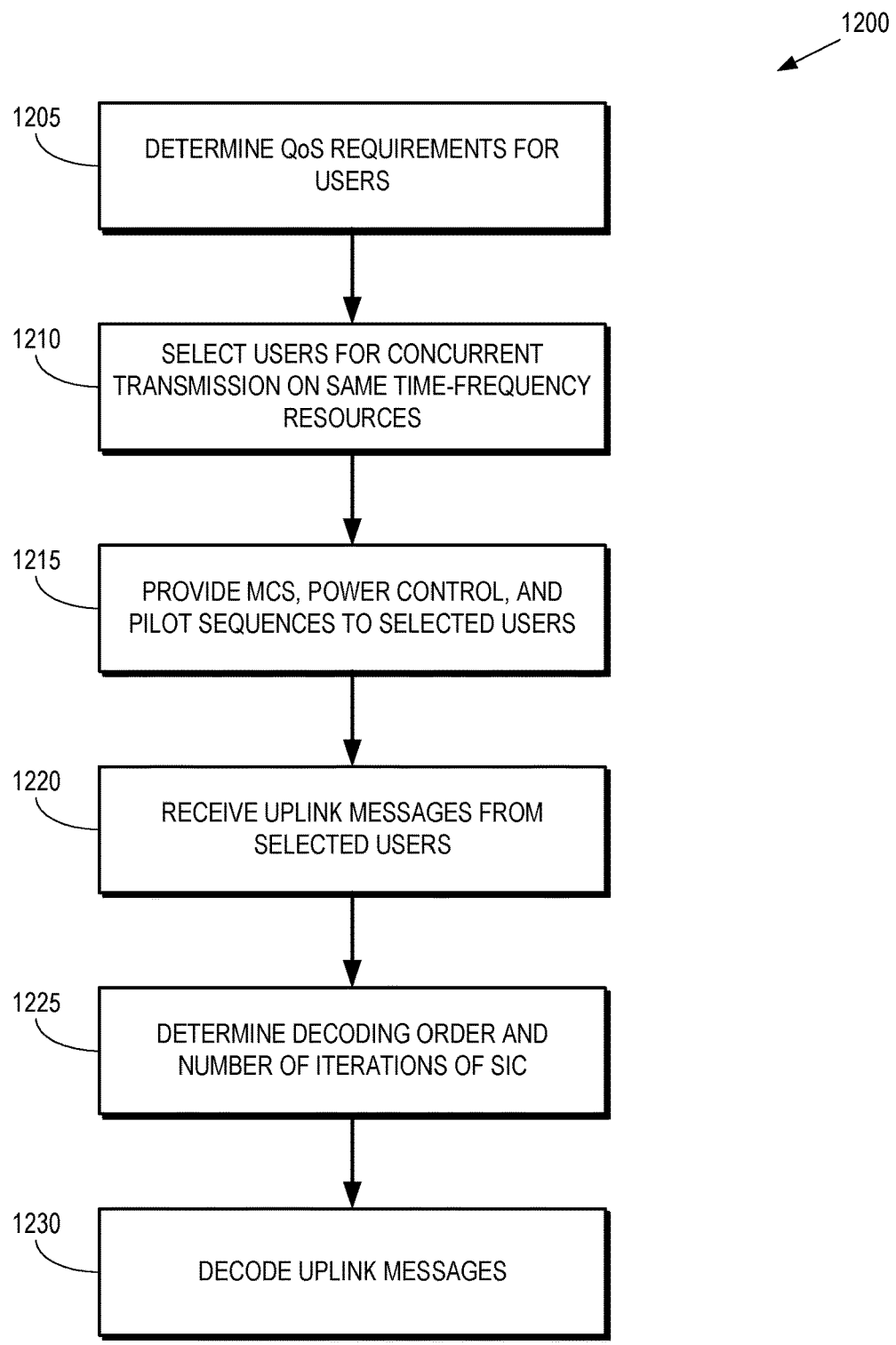
FIG. 12 is a flow diagram of a method of performing iterative SIC using soft decoding information associated with symbols transmitted by multiple users in a multiple user MIMO (MU-MIMO) configuration according to some embodiments.

FIG. 12 is a flow diagram of a method 1200 of performing Turbo-SIC on symbols transmitted by multiple users in a multiple user MIMO (MU-MIMO) configuration according to some embodiments. The method 1200 is implemented in some embodiments of the base station 105 shown in FIG. 1. In the illustrated embodiment, K independent users transmit K independent uplink data streams on the same time-frequency resources. The base station employs P receive antennas and implements a receiver such as the receiver 300 shown in FIG. 3 to perform iterative SIC using soft decoding information, as discussed herein. The order and number of iterations can be chosen based on predefined decoding latency targets.

At block 1205, the base station determines the quality-of-service (QoS) requirements for the users that are participating in the MU-MIMO communication. In some embodiments, different users can request different QoS requirements, which enables coexistence of heterogeneous QoS requirements on the same set of time-frequency resources.

At block 1210, the base station selects users for concurrent transmission on the same time-frequency resources. Some embodiments of the base station are configured to apply user selection to maximize system capacity and guarantee the QoS requirements for the users. The base station can also be configured to select the order and number of iterations for decoding messages from the K users.

At block 1215, the base station provides information indicating modulation and coding schemes (MCS), power control information, and sequences of pilot symbols to the selected users. Some embodiments of the base station are configured to apply user power control schemes to maximize system capacity and guarantee the QoS requirements for the users. The users are then configured for uplink transmissions based on the received MCS, power control information, and pilot symbols sequences.

At block 1220, the base station receives uplink messages from the selected users. The messages are received concurrently using the same time-frequency resources of the air interface.

At block 1225, the base station determines a decoding order for the received messages and the number of iterations for the Turbo-SIC process.

At block 1230, the base station decodes the uplink messages using the Turbo-SIC process. For example, the base station can decode the uplink messages using some embodiments of the method 400 shown in FIG. 4.

Some embodiments of the method 1200 support multiplexing multiple users with different QoS requirements in a spectrally efficient manner. For example, the method 1200 can be used to decode transmissions from multiple users with very low latency requirements by superposing them on conventional traffic. For another example, the method 1200 can be used to resolve collisions in a manner that improves system reliability.

Figure 13:
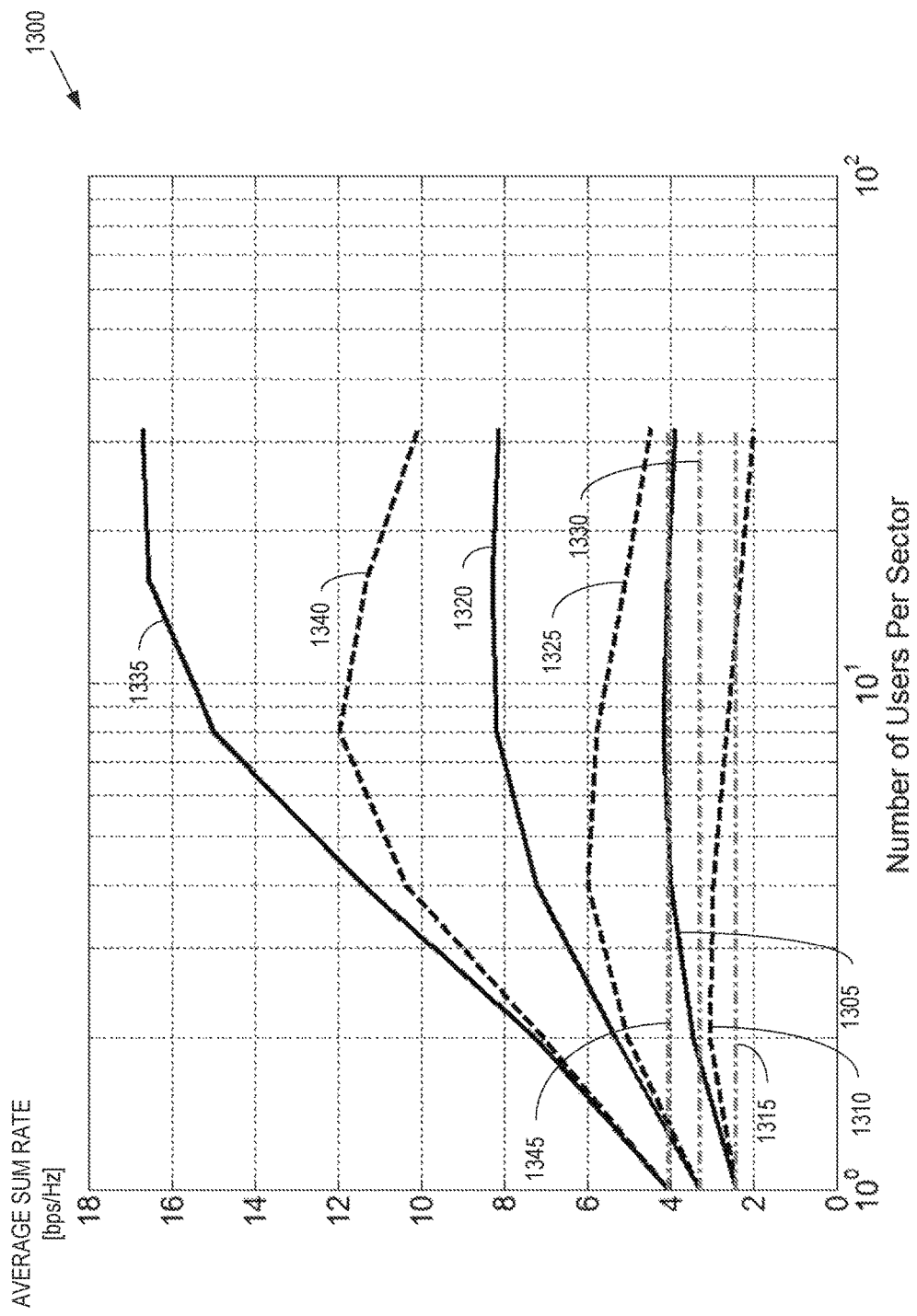
FIG. 13 is a plot that illustrates sum rates that can be achieved using iterative SIC using soft decoding information for cellular IoT applications according to some embodiments.

FIG. 13 is a plot 1300 that illustrates sum rates that can be achieved using iterative SIC using soft decoding information for cellular IoT applications according to some embodiments. The vertical axis of the plot 1300 indicates an average sum rate in bits per second per hertz (bps/Hz) and the horizontal axis indicates a number of users per sector served by a base station. In the illustrated embodiment, the number (K) of users is larger than the number (P) of receive antennas at the base station, e.g., K>>P. The plot 1300 compares the performance of Turbo-SIC to the performance of linear MMSE and time division multiple access (TDMA), in which case there is no superposition of users on the same time-frequency resources. The comparison is performed on the basis of the average sum rate achieved by the base station that implements each technique. The simulations are performed for three different configurations of receive antennas, P=2, P=4, and P=8.

The lines 1305, 1310, 1315 represent the sum rates achieved by Turbo-SIC, linear MMSE, and TDMA, respectively, for an antenna configuration including two receive antennas. The lines 1320, 1325, 1330 represent the sum rates achieved by Turbo-SIC, linear MMSE, and TDMA, respectively, for an antenna configuration including four receive antennas. The lines 1335, 1340, 1345 represent the sum rates achieved by Turbo-SIC, linear MMSE, and TDMA, respectively, for an antenna configuration including eight receive antennas. In each case, Turbo-SIC achieves the highest average sum rate and the advantage to implementing Turbo-SIC (over linear MMSE or TDMA) increases as the number of users per sector increases. Consequently, for a target rate per user, the base station implementing Turbo-SIC is able to support the largest number of users per sector.

Figure 14:
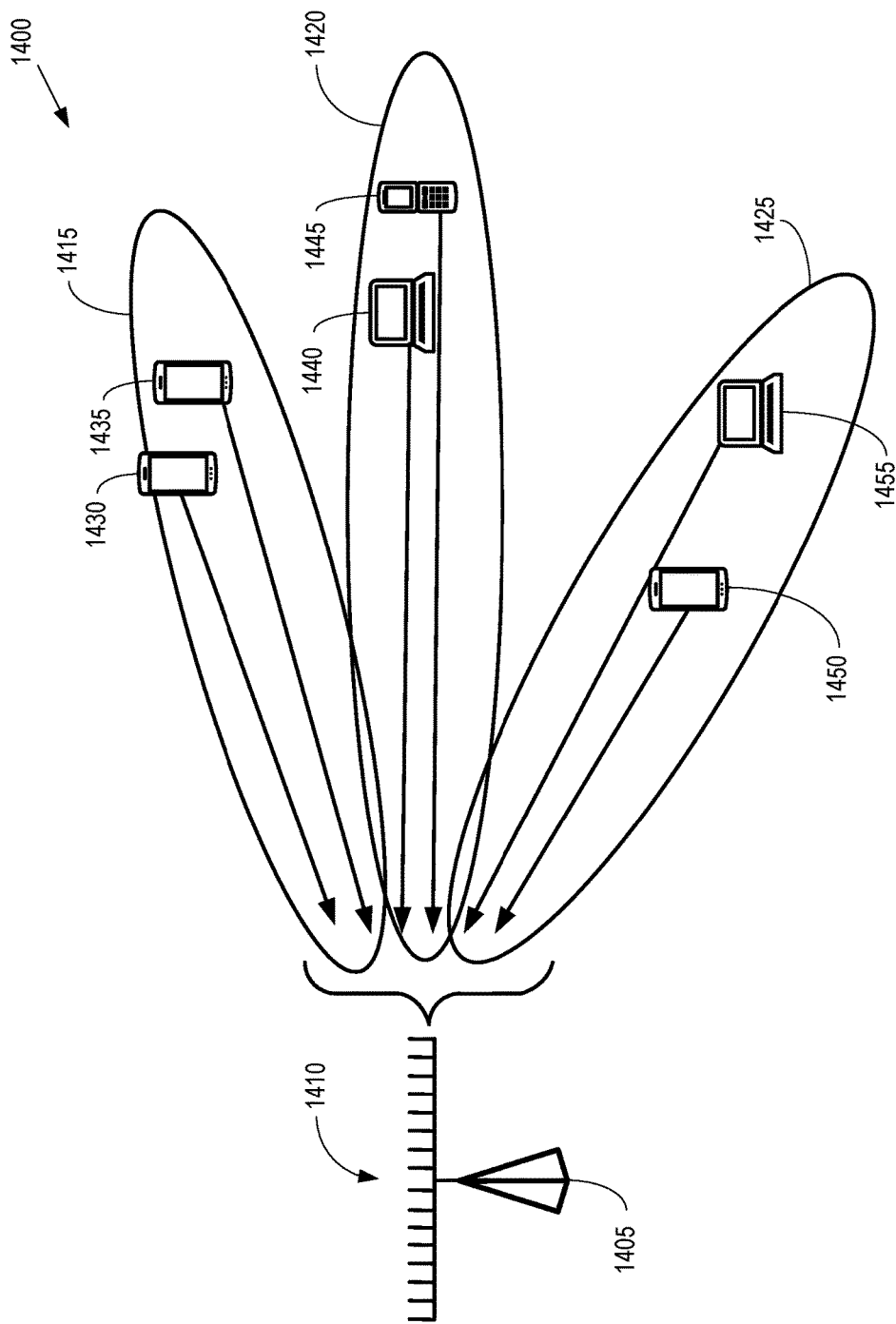
FIG. 14 is a diagram of a third example of a wireless communication system that supports iterative SIC using soft decoding information and beamforming according to some embodiments.

FIG. 14 is a diagram of a third example of a wireless communication system 1400 that supports Turbo-SIC and beamforming according to some embodiments. The wireless communication system 1400 includes a base station 1405 and an antenna array 1410. The number of antennas in the antenna array 1410 is large enough to allow the base station 1405 to generate high-resolution beams 1415, 1420, 1425 that form orthogonal spatial channels. For example, the high-resolution beams 1415, 1420, 1425 can be formed using carrier frequencies in the centimeter/millimeter range to provide gigabit per second data rates. The base station 1405 receives uplink signals from user equipment 1430, 1435, 1440, 1445, 1450, 1455 via the spatial channels defined by high-resolution beams 1415, 1420, 1425.

Although the spatial channels are orthogonal, the communication channels experienced by users within the high-resolution beams 1415, 1420, 1425 are typically spatially correlated. Consequently, conventional linear MMSE receivers are not always capable of decoding signals transmitted by users in the same time-frequency resources and within the same high-resolution beam 1415, 1420, 1425. For example, signals transmitted by the user equipment 1430, 1435 in the high-resolution beam 1415 using the same time-frequency resources are not effectively decoded using a conventional linear MMSE receiver. However, some embodiments of Turbo-SIC can effectively decode concurrent signals from multiple users in the same time-frequency resources of the same beam. For example, Turbo-SIC can be used to decode concurrent signals from the user equipment 1430, 1435 in the high-resolution beam 1415, as discussed herein. Turbo-SIC can also be applied when the beams 1415, 1420, 1425 are not completely orthogonal in space. Some embodiments of Turbo-SIC are configured to perform inter-beam interference cancellation on groups of users that are in different beams. For example, in a first step, intra-beam Turbo-SIC is performed separately on the user equipment 1430, 1435 in the beam 1415 and the user equipment 1440, 1445 in the beam 1420. In a second step, inter-beam Turbo-SIC is performed on the user equipment 1430, 1435, 1440, 1445 and the process is iterated until the user equipment 1430, 1435, 1440, 1445 are correctly detected or a maximum number of iterations is reached.

Figure 15:
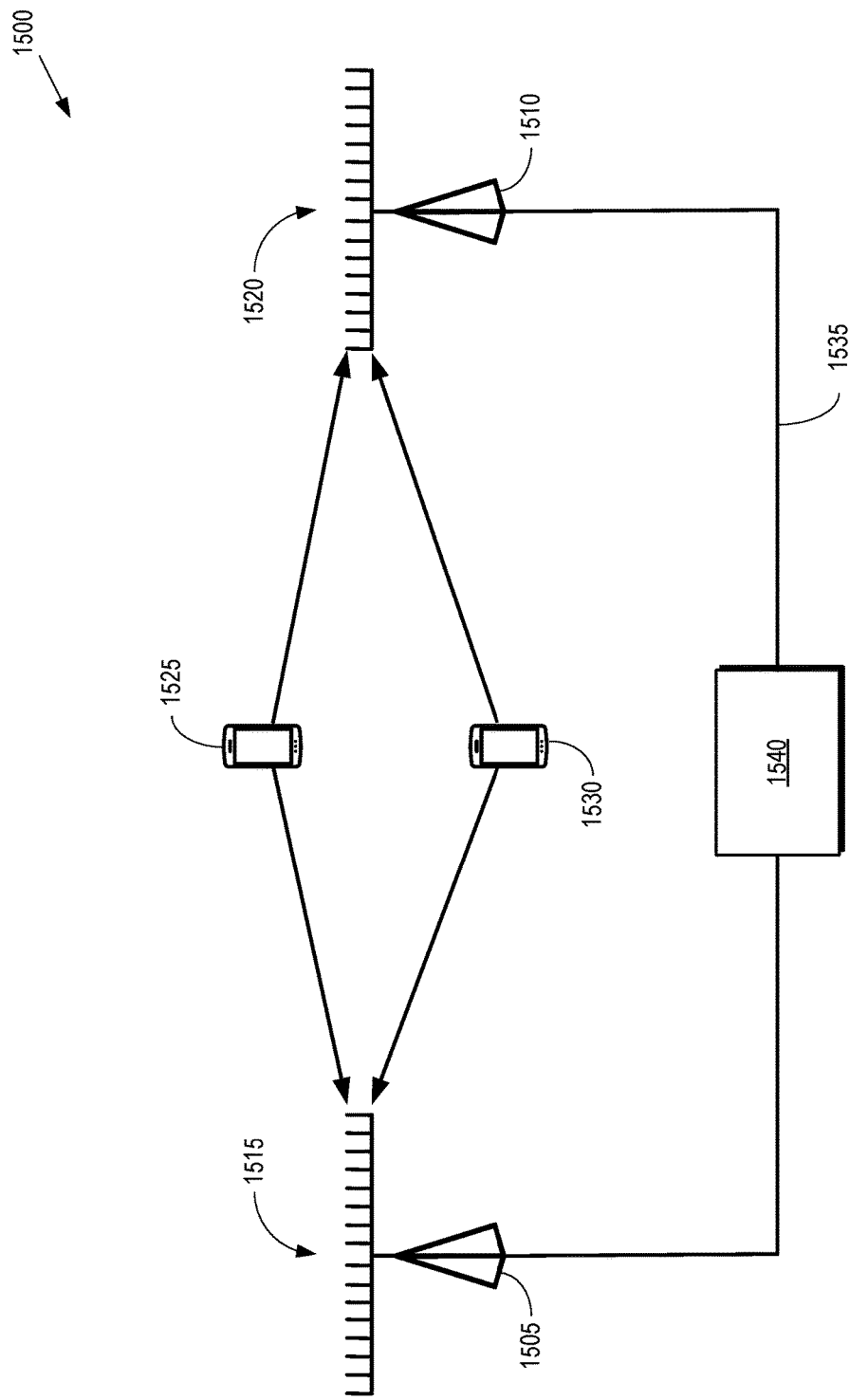
FIG. 15 is a diagram of a fourth example of a wireless communication system that implements coordinated multi-point reception according to some embodiments.

FIG. 15 is a diagram of a fourth example of a wireless communication system 1500 that implements coordinated multipoint reception according to some embodiments. The wireless communication system 1500 implements base stations 1505, 1510 with corresponding antenna arrays 1515, 1520. Although two base stations 1505, 1510 are shown in FIG. 15, some embodiments of the wireless communication system 1500 include more base stations that can participate in coordinated multipoint reception. The base stations 1505, 1510 receive signals that are a superposition of uplink signals received from multiple user equipment 1525, 1530, which transmit the concurrent uplink signals in shared time-frequency resources. The base stations 1505, 1510 are connected by a backhaul interface 1535, which (optionally) includes a controller 1540 in some embodiments.

Both base stations 1505, 1510 receive signals representative of the same messages sent by the different user equipment 1525, 1530. In some embodiments, the base stations 1505, 1510 perform coordinated multipoint reception by independently applying Turbo-SIC to the superposition of signals received from the user equipment 1525, 1530. The base stations 1505, 1510 can then exchange soft decoding information (such as LLRs) over the backhaul interface 1535 after each iteration of Turbo-SIC performed by the base stations 1505, 1510. The exchanged information can subsequently be used for the next iteration of Turbo-SIC performed by the base stations 1505, 1510. The process can continue until symbols transmitted by the user equipment 1525, 1530 are successfully decoded, or until a maximum number of iterations or exchanges is reached. Some embodiments of the backhaul interface 1535 include abundant backhaul capacity that supports conveying the superposed signals received by the base stations 1505, 1510 to a central location such as the controller 1540, which applies Turbo-SIC to the combined signals received over the backhaul interface 1535.

Figure 16:
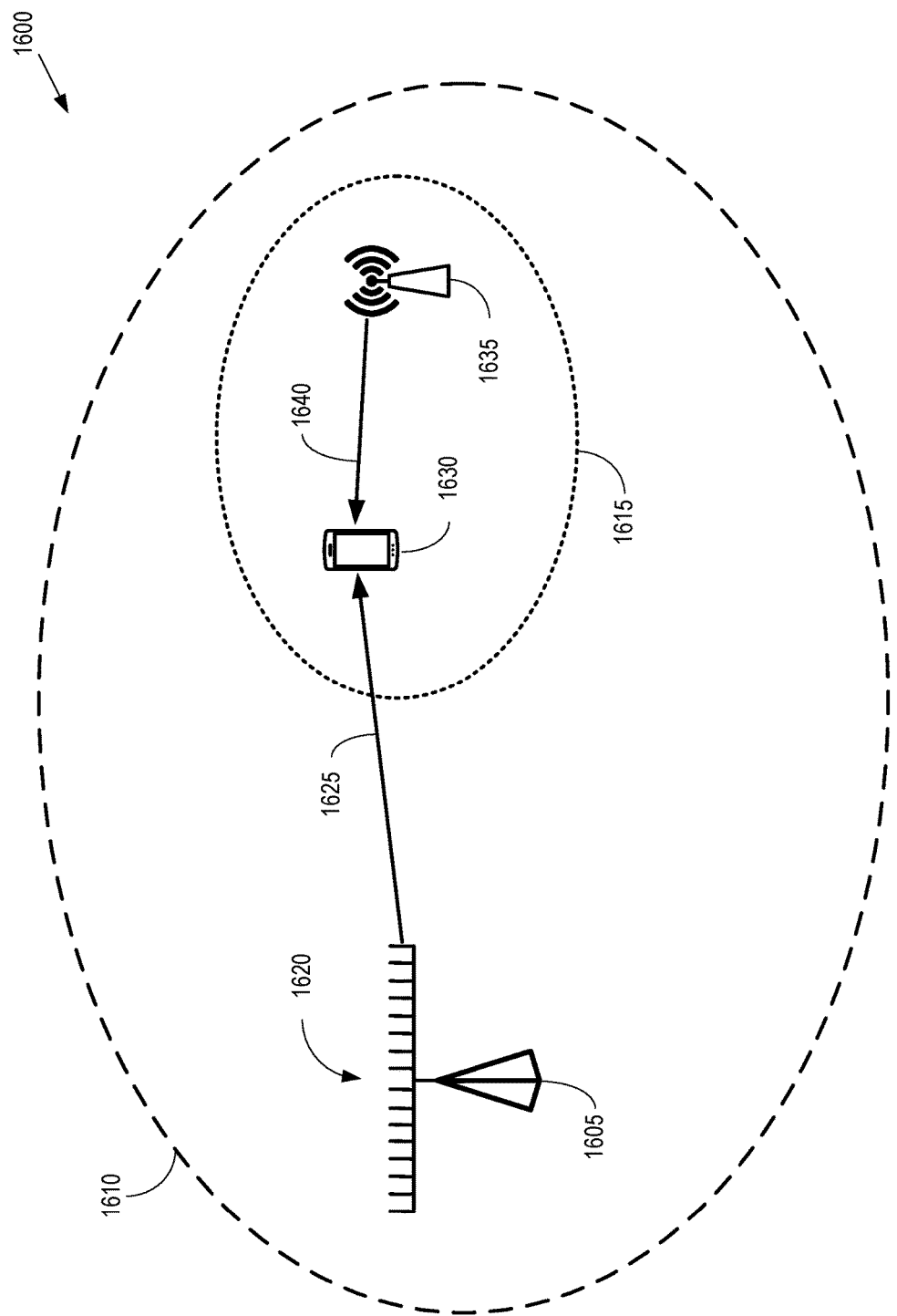
FIG. 16 is a diagram of an example of a heterogeneous network that includes a base station that serves a macrocell that overlaps with one or more small cells according to some embodiments.

FIG. 16 is a diagram of an example of a heterogeneous network 1600 that includes a base station 1605 that serves a macrocell 1610 that overlaps with one or more small cells 1615 according to some embodiments. The base station 1605 implements an antenna array 1620 that is used to transmit downlink signals 1625 to one or more user equipment 1630. An access point 1635 also transmits downlink signals 1640 to the user equipment 1630 within the small cell 1615. The downlink signals 1625, 1640 transmitted concurrently using the same time-frequency resources of the corresponding air interfaces. Consequently, the downlink signals 1625, 1640 interfere with each other at the user equipment 1630. Some embodiments of the user equipment 1630 therefore implement a receiver (such as the receiver 300 shown in FIG. 3) that is configured to perform Turbo-SIC, as discussed herein. The Turbo-SIC technique can be used to cancel interference from one of the downlink signals 1625, 1640 so that the other downlink signal 1625, 1640 can be decoded at lower SNR. The Turbo-SIC technique can also be used to allow the user equipment 1630 to receive independent messages in the downlink signals 1625, 1640 from both the base station 1605 and the access point 1635. In order to perform Turbo-SIC on one or more of the downlink signals 1625, 1640, the user equipment 1630 is made aware of the pilot symbols transmitted by the corresponding base station 1605 or access point 1635.

Figure 17:
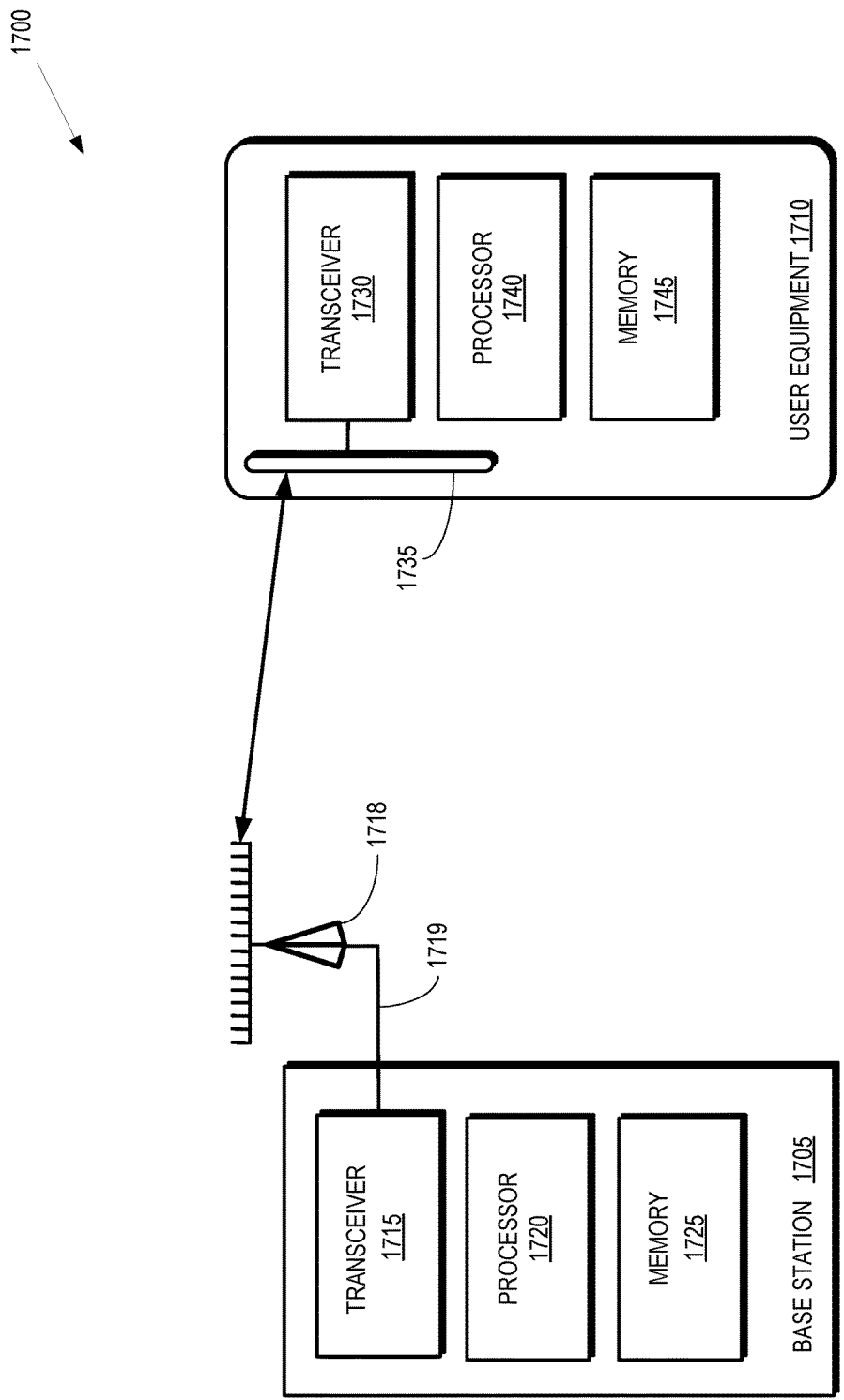
FIG. 17 is a block diagram of a fifth example of a wireless communication system that implements iterative SIC using soft decoding information according to some embodiments.

FIG. 17 is a block diagram of a fifth example of a wireless communication system 1700 that implements iterative SIC using soft decoding information according to some embodiments. The communication system 1700 implements a base station 1705 and user equipment 1710. The base station 1705 is used to implement some embodiments of the base station 105 shown in FIG. 1, the base station 1105 shown in FIG. 11, the base station 1405 shown in FIG. 14, the base stations 1505, 1510 shown in FIG. 15, and the base station 1605 shown in FIG. 16. The user equipment 1710 is used to implement some embodiments of the user equipment 110-115 shown in FIG. 1, the user equipment 1115 shown in FIG. 11, the user equipment 1430, 1435, 1440, 1445, 1450, 1455 shown in FIG. 14, the user equipment 1525, 1530 shown in FIG. 15, and the user equipment 1630 shown in FIG. 16.

The base station 1705 includes a transceiver 1715 that is connected to an antenna array 1718 for transmitting and receiving signals. The transceiver 1715 can be implemented as a single integrated circuit (e.g., using a single application-specific integrated circuit, ASIC, or field programmable gate array, FPGA) or as a system-on-a-chip (SOC) that includes different modules for implementing the functionality of the transceiver 1715. The antenna array 1718 supports MIMO communication and is used to implement some embodiments of the antenna array 130 shown in FIG. 1. In some embodiments, the base station 1705 and the antenna array 1718 are implemented in different locations, in which case the antenna array 1718 can be referred to as a remote radio head (RRH) in a distributed base station architecture. In that case, the antenna array 1718 is coupled to the base station 1705 by an optical interface 1719 implemented using optical fibers. The interface 1719 carries optical signals such as Control, Management, Sync, and IQ signals. Some embodiments of the RRH implement multiple wireless standards or technologies. The RRH contains radiofrequency (RF) circuitry including filters plus analog-to-digital or digital-to-analog converters and up/down converters and antenna(s). For example, the RRH can implement Digital Up Conversion (DUC), Digital Down Conversion (DDC), Crest Factor Reduction (CFR), Digital Pre-Distortion (DPD), as well as other operation and management functions. A distance between the base station 1705 and the RRH can be on the order of 10 kilometers so that the RRH can be used to extend the coverage of the base station 1705 to remote rural areas. Some embodiments of the RRH are implemented using FPGAs.

The base station 1705 also includes a processor 1720 and a memory 1725. The processor 1720 can be used to execute instructions stored in the memory 1725 and to store information in the memory 1725 such as the results of the executed instructions. The processor 1720 can therefore be used to implement some embodiments of the receiver 300 shown in FIG. 3, the method 400 shown in FIG. 4, the method 900 shown in FIG. 9, and the method 1200 shown in FIG. 12. In embodiments that implement the antenna array 1718 as an RRH, the processor 1720 is configured to implement a baseband processing chain to perform operations such as scrambling, channel coding and modulation, and the like. Separating the base station 1705 from the antenna array 1718 supports offloading of IF and RF processing from the base station 1705 to the antenna array 1718. Implementing the antenna array 1718 as an RRH also allows for increasing the distance between the base station 1705 and the antenna array 1718. Comparatively inexpensive optical fiber can then be used to carry data between the base station 1705 and the antenna array 1718.

The user equipment 1710 includes a transceiver 1730 that is coupled to an antenna 1735 for transmitting and receiving signals. The transceiver 1730 can be implemented as a single integrated circuit (e.g., using a single ASIC or FPGA) or as a system-on-a-chip (SOC) that includes different modules for implementing the functionality of the transceiver 1730. The user equipment 1710 also includes a processor 1740 and a memory 1745. The processor 1740 can be used to execute instructions stored in the memory 1745 and to store information in the memory 1745 such as the results of the executed instructions. The user equipment 1710 can therefore be used to implement some embodiments of the receiver 300 shown in FIG. 3, the method 400 shown in FIG. 4, the method 900 shown in FIG. 9, and the method 1200 shown in FIG. 12.

At least parts of the wireless communication system 1700 can be implemented using network function virtualization (NFV), which is a network architecture that makes use of technologies of computer virtualization. In an NFV architecture, entities such as the base station 1705 or parts thereof or part of their functions can be virtualized using software building blocks that may connect, or interact, to create communication services. A virtualized network function of, e.g. the base station 1705, may include at least one virtual machine running different software and processes, on top of standard high-volume servers, switches and storage, or a cloud computing infrastructure, instead of having customized hardware appliances for each network function. As such a base station function may be implemented using a computer program product embodied on a non-transitory computer readable medium for performing operations. The computer program product may include instructions, that when executed by a processor, perform the operations of the specific base station function. A radio interface of a base station or a radio interface of an access point may be located in one location and corresponding processing functions can be located at a remote location. The entities at the different locations may be connected via optical links or other wired or wireless communication links. Base stations or access points that implement radio interfaces and corresponding processing functions at different locations may be referred to as distributed base stations or access points. Remotely located radio interfaces may also be referred to as remote radio head (RRH).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   receiving a first signal that is a superposition of symbols transmitted concurrently by a set of users in shared resources of an aft interface; and
   performing successive interference cancellation for the set of users, wherein an iteration of successive interference cancellation for a current user in the set of users comprises:
      canceling, for the current user, interference in the first signal produced by the symbols transmitted by previous users in the set of users, wherein canceling the interference is performed based on soft estimates of symbols transmitted by the previous users, wherein the soft estimates of the symbols transmitted by the previous users were reconstructed in previous iterations of the successive interference cancellation based on previous log likelihood ratios (LLRs) generated by decoding of the symbols transmitted by the previous users;
      decoding a current symbol transmitted by the current user and received in the first signal after canceling the interference based on the soft estimates of the symbols transmitted by the previous users;
      reconstructing a current soft estimate of the current symbol transmitted by the current user based on a current LLR that represents a likelihood that the decoded current symbol is the same as the current symbol transmitted by the current user; and
      feeding back the current soft estimate of the current symbol transmitted by the current user to cancel interference in at least one subsequent iteration of the successive interference cancellation for the set of users.

2. The method of claim 1, further comprising:
   performing multi-user minimum mean square estimation (MMSE) to determine estimated channels based on pilot symbols received from the set of users.

3. The method of claim 2, wherein canceling, for the current user, the interference in the first signal produced by the symbols transmitted by the previous users in the set of users further comprises generating an estimated interference by combining the estimated channels with the reconstructed soft estimates of the symbols transmitted by the previous users and subtracting the estimated interference from the first signal.

4. The method of claim 3, wherein the iteration of successive interference cancellation for the current user in the set of users further comprises:
   generating an error variance matrix based on the current LLR.

5. The method of claim 4, wherein generating the error variance matrix comprises generating diagonal elements of the error variance matrix using a quadratic function of the current LLR.

6. The method of claim 4, wherein the iteration of successive interference cancellation for the current user in the set of users further comprises:
   applying MMSE equalization to the first signal after subtracting the estimated interference from the first signal to generate an equalized signal, wherein the MMSE is performed for the current user based on the error variance matrix and the estimated channels.

7. The method of claim 6, wherein decoding the symbols current symbol transmitted by the current user comprises decoding the equalized signal.

8. The method of claim 7, wherein the iteration of successive interference cancellation for the current user in the set of users further comprises:
   updating a value of the current LLR and the current soft estimate in response to decoding the equalized signal; and
   providing the updated value of the current LLR and the current soft estimate for use in a subsequent iteration of successive interference cancellation.

9. The method of claim 1, wherein performing the successive interference cancellation comprises performing the iterations of successive interference cancellation until detecting all of the set of users or reaching a maximum number of iterations.

10. The method of claim 1, further comprising:
    determining a first number of the set of users that are to transmit the first signal including the superposition of symbols in the shared resources of the air interface; and
    providing, to the first number of the set of users, information indicating modulation and coding schemes, power control settings, and pilot sequences to be used for transmitting the symbols.

11. An apparatus comprising:
    a transceiver configured to receive a first signal that is a superposition of symbols transmitted concurrently by a set of users in shared resources of an air interface; and
    a processor configured to perform successive interference cancellation for the set of users, wherein an iteration of successive interference cancellation for a current user in the set of users comprises:
       canceling, for the current user, interference produced in the first signal by the symbols transmitted by previous users in the set of users based on soft estimates of symbols transmitted by the previous users, wherein the soft estimates of the symbols transmitted by the previous users were reconstructed in previous iterations of the successive interference cancellation based on previous log likelihood ratios (LLRs) generated by decoding of the symbols transmitted by the previous users;
       decoding a current symbol transmitted by the current user and received in the first signal after canceling the interference based on the soft estimates of the symbols transmitted by the previous users;
       reconstructing a current soft estimate of the current symbol transmitted by the current user based on a current LLR that represents a likelihood that the decoded current symbol is the same as the current symbol transmitted by the current user; and
       feeding back the current soft estimate of the current symbol transmitted by the current user to cancel interference in at least one subsequent iteration of the successive interference cancellation.

12. The apparatus of claim 11, wherein the processor is further configured to estimate channels using multi-user minimum mean square estimation (MMSE) based on pilot symbols received from the set of users.

13. The apparatus of claim 12, wherein the processor is further configured to generate an estimated interference in the iteration of successive interference cancellation for the current user by combining the estimated channels with the reconstructed soft estimates of the symbols transmitted by the previous users, and wherein the processor is configured to subtract the estimated interference from the first signal in the iteration of successive interference cancellation for the current user.

14. The apparatus of claim 13, wherein the processor is further configured to generate an error variance matrix based on the current LLR in the iteration of successive interference cancellation for the current user.

15. The apparatus of claim 14, wherein the processor is further configured to generate diagonal elements of the error variance matrix using a quadratic function of the current LLR in the iteration of successive interference cancellation for the current user.

16. The apparatus of claim 14, wherein the processor is further configured to apply MMSE equalization to the first signal in the iteration of successive interference cancellation for the current user after subtracting the estimated interference from the first signal to generate an equalized signal, wherein the MMSE is performed on the basis of the error variance matrix and the estimated channels.

17. The apparatus of claim 16, wherein the processor is further configured to decode the equalized signal in the iteration of successive interference cancellation for the current user.

18. The apparatus of claim 17, wherein the processor is further configured to:
update a value of the current LLR and the current soft estimate in response to decoding the equalized signal in the iteration of successive interference cancellation for the current user; and
provide the updated value of the current LLR and the current soft estimate in the iteration of successive interference cancellation for the current user for use in a subsequent iteration of successive interference cancellation.

19. The apparatus of claim 11, wherein the processor is configured to perform additional iterations of the successive interference cancellation until detecting all of the set of users or reaching a maximum number of iterations.

20. The apparatus of claim 11, wherein the apparatus is a base station, and wherein:
the processor is further configured to determine a first number of the set of users that are to concurrently transmit symbols in the shared resources of the air interface; and
the transceiver is further configured to provide, to the first number of the set of users, information indicating modulation and coding schemes, power control settings, and pilot sequences to be used for transmitting the symbols.

21. An apparatus comprising:
a receiver configured to receive a first signal that is a superposition of data streams transmitted concurrently in shared resources of an air interface; and
a processor configured to perform successive interference cancellation (SIC) on the first signal, wherein an iteration of the SIC comprises:
canceling, for a first data stream in the superposition of data streams, interference produced in the first signal based on soft estimates of symbols transmitted in at least one second data stream in the superposition of data streams, wherein the soft estimates were reconstructed in previous iterations of the SIC based on previous log likelihood ratios (LLRs) generated by decoding of the symbols transmitted in the at least one second data stream;
decoding a first symbol transmitted in the first data stream and received in the first signal after canceling the interference based on the soft estimates of the symbols transmitted in the at least one second data stream;
reconstructing a first soft estimate of the first symbol in the first data stream based on a first LLR that represents a first likelihood that the decoded first symbol is the same as the first symbol transmitted in the first data stream; and
feeding back the first estimate of the first symbol transmitted in the first data stream to cancel interference in at least one subsequent iteration of the SIC.

* * * * *

UNITED STATES PATENT AND TRADEMARK OFFICE
CERTIFICATE OF CORRECTION

PATENT NO. : 10,484,210 B2
APPLICATION NO. : 15/472865
DATED : November 19, 2019
INVENTOR(S) : Marcos Tavares et al.

It is certified that error appears in the above-identified patent and that said Letters Patent is hereby corrected as shown below:

In the Claims

At Column 19 Line 17, please delete "an aft interface" and insert --an air interface--.

At Column 20 Lines 9-10, please delete "the symbols current symbol" and insert --the current symbol--.

Signed and Sealed this
Twenty-fourth Day of March, 2020

Andrei Iancu
*Director of the United States Patent and Trademark Office*